(12) United States Patent
Takahashi et al.

(10) Patent No.: US 6,522,370 B2
(45) Date of Patent: Feb. 18, 2003

(54) LIQUID CRYSTAL DISPLAY UNITS

(75) Inventors: Takuya Takahashi, Hitachi (JP); Masahiro Ishii, Mobara (JP); Tsutomu Kasai, Mobara (JP); Tetsuya Kawamura, Mobara (JP); Katsumi Tamura, Hitachi (JP); Toshiki Kaneko, Chiba (JP); Kenichi Onisawa, Chiba (JP)

(73) Assignee: Hitachi, Ltd., Tokyo (JP)

( * ) Notice: Subject to any disclaimer, the term of this patent is extended or adjusted under 35 U.S.C. 154(b) by 121 days.

(21) Appl. No.: 09/811,553

(22) Filed: Mar. 20, 2001

(65) Prior Publication Data

US 2002/0057394 A1 May 16, 2002

(30) Foreign Application Priority Data

Nov. 10, 2000 (JP) ........................................ 2000-349305

(51) Int. Cl.$^7$ ....................... G02F 1/136; G02F 1/1343; H01L 29/04
(52) U.S. Cl. ........................... 349/43; 349/42; 349/139; 349/147; 257/59; 257/72

(56) References Cited

U.S. PATENT DOCUMENTS 5,162,933 A * 11/1992 Kakuda et al. ............... 257/55
6,081,308 A * 6/2000 Jeong et al. .................. 257/59
6,130,443 A * 10/2000 Hong et al. .................. 257/347
2001/0010573 A1 * 8/2001 Ohta et al. ................... 349/139
2001/0022633 A1 * 9/2001 Kwak et al. .................. 349/43

* cited by examiner

Primary Examiner—William L. Sikes
Assistant Examiner—Tarifur R. Chowdhury
(74) Attorney, Agent, or Firm—Antonelli, Terry, Stout & Kraus, LLP

(57) ABSTRACT

A liquid crystal display unit is used that has data lines made of a molybdenum-alloyed film having a chromium content from 2 wt. % or more, but up to 5 wt. %, or a molybdenum-alloyed film lamination (Mo—Cr) consisting of a first electroconductive film and a second electroconductive film, with the first electroconductive film having a chromium content from 2 wt. % or more, but up to 5 wt. % and the second electroconductive film being provided above the first electroconductive film and containing less chromium than the first electroconductive film does. The use of the data lines composed of these materials enables the following requirements to be satisfied: high dry-etching resistance, low resistance, low ACF contact resistance, low side etching rates, forward tapered wiring cross-sectional shape, and up to two lamination layers.

26 Claims, 16 Drawing Sheets

LIQUID CRYSTAL DISPLAY UNITS

BACKGROUND OF THE INVENTION

The present invention relates to active matrix type liquid crystal display units (AM-LCD units) driven by thin film transistors (TFTs), and to processes concerning the manufacture of these AM-LCD units.

The market for thin film transistor-driven liquid crystal display units (TFT-LCD units) is expanding as these imaging display units are further improved in thickness, weight, and resolution. In recent years, along with the tendency of TFT-LCD units to increase in screen size and in resolution, the need for reduced resistance values relating to signal lines and their terminals and improved production yields has been increasingly stringent. Reduction in production costs is also being demanded.

For LCD units of the active matrix type, scanning lines extending in a horizontal (x-axial) direction and arranged in parallel in a vertical (y-axial) direction, and data lines extending in a vertical (y-axial) direction and arranged in parallel in a horizontal (x-axial) direction, are formed on the liquid crystal side of one of a pair of transparent substrates opposed to each other via liquid crystals, and the rectangular areas surrounded by these signal lines are used as pixel areas. Each pixel area is provided with both thin film transistors driven by scanning signals supplied from the scanning signal lines on one side, and pixel electrodes driven by data signals supplied from the data lines on another side via the foregoing thin film transistors. Each pixel is driven by scanning signals or data signals, and these scanning signals or data signals are supplied through the terminals of the scanning lines or data lines extending to the outer area of the display section that is formed as a set of pixel areas.

Each scanning line and each data line are sheathed with either an insulating film that also functions as the gate insulator of a thin film transistor, or a passivation film that also functions to avoid direct contact with the liquid crystals of said thin film transistor. The terminals of these signal lines are exposed by provision of holes in the insulating film or passivation film. It is known that the occurrence of so-called "electrocorrosion" can be prevented by sheathing said exposed surfaces with poly-crystalline indium tin oxide (p-ITO), one type of indium tin oxide consisting mainly of a poly-crystalline phase.

Each scanning line is required to be low in electrical resistance, to have sufficient dry-etching resistance so as not to be lost by dry etching intended to provide holes in its insulating film or passivation film, and to come into proper contact with p-ITO at its terminals. For these reasons, scanning signal lines are made of materials such as a chromium-molybdenum (CrMo) alloy/chromium (Cr) film, where the slash "/" denotes lamination and the left and right sides of the slash denote the upper and lower layers, respectively, of the lamination. (Hereinafter, the slash and both sides thereof mean the same.) In addition to satisfying the above-mentioned requirements, each data line is further required to come into proper contact with amorphous silicon since the source electrode and drain electrode of the thin film transistor are to be formed at the same time. Also, it is desirable that each data line be capable of being provided with wet-etching to ensure the selectability between the gate insulator and amorphous silicon during etching. For these reasons, data lines are made of materials such as a CrMo alloy/Cr film. The use of these wiring materials enables the amount of side etching to be reduced below 1 $\mu$m and the cross section of the wiring to be processed into a tapered shape. These processing characteristics, in turn, enable the obtainment of thin film transistors provided with excellent characteristics, including a channel length of 7 $\mu$m or less, and can be applied to pixel electrode processing for an In-Plane Switching(IPS) type of LCD unit.

Signal wiring in an LCD unit is formed so that a voltage is applied by the driver chips mounted in the LCD unit, and the electrical connection resistances at the connections (contacts or terminals) of these driver chips are also required to be reduced. In recent years, significant decreases in the areas of the contacts, coupled with further improvements in display resolution, have resulted in a tendency towards increased connection resistance. For example, the method of mounting drivers in an LCD unit is shifting from the conventional TCP (Tape Carrier Package) method to the COG (Chip-on-Glass) method, and decreases in the areas of the contacts in the case of this method are significant. The terminals of the signal lines sheathed with the above-mentioned p-ITO satisfy the need for reduced electrical connection resistance. Also, p-ITO satisfies the functional requirements of transparent pixel electrodes, and the transparent pixel electrodes and the terminal sheathing mentioned above are formed at the same time during the manufacturing processes.

Further progress of LCD units in terms of dimensions and resolution results in a more stringent need for reduction in the electrical resistance of scanning lines, in particular. Accordingly, materials that include aluminum (Al) or Al alloy will be used, instead of the CrMo alloy/Cr film mentioned above. (Hereinafter, such signal lines are also referred to as aluminum wiring). Also, wiring structure in which Mo or the like is included in the upper layer of Al or Al alloy is usually employed so that proper contact with p-ITO can be obtained at the terminals of the scanning lines. For example, molybdenum-zirconium (MoZr)/Al-alloyed films whose upper layer is made of an MoZr alloy that includes Zr at a rate from 2.6 to 23 weight % enables favorable etching into the forward tapered cross section of the wiring, and gives sufficient dry-etching resistance to the MoZr layer required when the insulating film on the Mozr/Al-alloyed films is provided with through-hole processing.

It was verified, however, that the use of scanning signal lines made of aluminum wiring and the use of transparent pixel electrodes and terminal sheathing made of p-ITO or the like induce the following inconvenience: to etch p-ITO, it is absolutely necessary to use a strong halogen acid solution, such as a hydrobromic acid (HBr) solution, and these solutions permeate defects in the insulating film sheathing the signal line and also functioning as the gate insulator of the thin film transistor, and defects in the passive film functioning as an insulating film to avoid direct contact with the crystals of that thin film transistor. Thus, the signal line is disconnected, and this, in turn, reduces production yields and increases production costs.

One method that can be used to prevent the signal line from being disconnected is by using either amorphous ITO (a-ITO) or indium-zinc oxide (IZO), instead of p-ITO, as transparent pixel electrodes and terminals, and further using oxalic acid ($(COOH)_2$) as the etchant for processing these electrodes and the terminal sheathing, since the rate of dissolution of aluminum and aluminum alloy in oxalic acid is sufficiently low that signal line disconnections are not caused.

The selection of a-ITO or IZO, however, will give significantly high connection resistance to the driving circuits and turn out to be a long way from achieving the intended purpose of reducing the electrical contact resistance. FIG. 14 is a graph showing the contact resistance values of p-ITO, a-ITO, and IZO materials. In FIG. 14, the horizontal axis denotes changes in the needle pressure applied to each material, and the vertical axis denotes changes in the contact resistance between each material and the needle at that time. For LCD units, the bump pressures driving chips applied to the signal lines of the terminals are considered to almost stay within range A of the graph, and, in this case, it can be seen that, in terms of reduction in contact resistance, using p-ITO is much more effective than using a-ITO or IZO.

Such increases in connection resistance due to the selection of a-ITO or IZO can be suppressed by removing a portion or all of the a-ITO or IZO sheathing from the terminals of the signal lines and thus exposing the metallic portions of the terminal wiring. Incidentally, FIG. 15 shows data on the contact resistance between various materials and an anisotropic conductive film (ACF). Direct contact with MoZr/Al alloyed films and CrMo alloy/Cr film, compared with that of a-ITO or IZO sheathed terminals, reduces the contact resistance with respect to ACF. Compared with the applicability to the TCP method, however, the value of the contact resistance between a CrMo/Cr and ACF does not decrease to such an extent that this value can be applied to the COG method in which the area of the contact section is greatly reduced. Contact resistance between ACF and the MoZr/Al-alloyed film used for the scanning lines is low enough to permit application to the COG method.

SUMMARY OF THE INVENTION

The problem that the present invention is to solve, therefore, is how to create, in view of the factors discussed above, data line, source electrode, and drain electrode film materials that satisfy the following requirements:

(1) The materials must have dry-etching resistance and not be lost during through-hole processing of the insulating film.

(2) The materials must have a specific resistance value equivalent to, or less than that of, a CrMo/Cr film.

(3) The materials must permit etching with an etchant that will scarcely etch SiN, which is the material used for the insulating film.

(4) In order to obtain thin film transistors having excellent characteristics, the materials must enable the amount of side etching to be reduced below 1 μm and the channel lengths of the thin film transistors to be reduced to 7 μm or less.

(5) The materials must enable the cross section of the electrodes or signal lines or to be tapered and the pixel electrodes of an IPS type LCD unit to be processed.

(6) Contact resistance with respect to ACF must be low enough to permit application to the COG method.

(7) The number of film layers must not exceed two.

It is obvious from the above description that except for requirement (6) above, the CrMo/Cr film mentioned above can be applied. Also, except for requirement (7) above, an Mo/Al/Mo-alloyed triple-layer film is most likely to satisfy all other requirements. However, since triple-layer film deposition by spattering is a time-consuming operation, this reduces productivity significantly. Also, a large-scale deposition apparatus is required and this increases plant investment. For the present invention, therefore, we have searched for suitable single-layer or double-layer film materials.

The film materials that satisfy requirements (1) to (7) above are a molybdenum-alloyed film having a chromium content from 2 weight % or more, but up to 5 weight %, and a molybdenum-alloyed film lamination consisting of a first electroconductive film and a second electroconductive film, with the first electroconductive film having a chromium content from 2 weight % or more, but up to 5 weight %, and the second electroconductive film being provided above the first electroconductive film and having a smaller chromium content than the first electroconductive film. The use of either such film material for the source electrode and drain electrode of a thin film transistor enables this transistor to have a high performance, and/or even more effects can be obtained by using either material for a data line. In short, it is effective to use these materials for the source electrode and drain electrode of a thin film transistor and/or for data line. Materials data proving this are described below.

The high-melting-point metals that can satisfy requirement (3) above are molybdenum (Mo) and chromium (Cr). Also, it has been considered from the data of FIG. 15 that Mo-based alloys are lower than Cr-based alloys in terms of contact resistance with respect to ACF. We have therefore searched for candidate materials within the range of Mo-based alloys.

FIG. 16 shows investigation results relating to the effects of added elements on the dry-etching resistance of an Mo alloy. It can be seen from this figure that dry-etching resistance can be enhanced by adding Cr, Zr and Hf to Mo. FIG. 17 represents the relationship between the $SF_6$ plasma dry-etching rate of an Mo alloy and its added elements (Cr, Zr, and Hf). Incidentally, the dry-etching rate of SiN, which is the insulating film material, is 7.3 nm/sec. To allow for its use as a material for the data lines, it is desirable that the selection ratio of Mo alloy etching with respect to SiN etching should be at least about seven times as great, and the dry-etching rate of an Mo alloy is required to not exceed 0.13 nm/sec. The composition of the Mo alloy satisfying these requirements is: MoCr (Cr≧1.5 weight %), MoZr (Zr≧5.0 weight %), MoHf (Hf≧8.0 weight %).

FIGS. 18(a) and 18(b) show the relationship between the resistivity of an Mo alloy and the quantities of added elements (Cr, Zr, and Hf). FIG. 18(a) shows data that was obtained by adding Cr, and FIG. 18(b) shows data that was obtained by adding Zr and Hf. Incidentally, the resistivities of CrMo/Cr films are about 220 nΩ·m. Although each element increases in resistivity with increases in the amount of added elements, when the resistivity of each element is compared on the basis of the minimum quantity of added elements that satisfies the dry-etching resistance mentioned above, the resistivities of an MoZr film having a Zr content of 5.0 weight % and an MoHf film having an Hf content of 8.0 weight % are about 300 nΩ·m, which is well above the resistivities of CrMo/Cr films. An MoCr film with a Cr content of 1.5 weight %, however, has a resistivity of about 180 nΩ·m, which is lower than that of the CrMo/Cr film, and even the resistivity of an MoCr film having a Cr content less than 5.0 weight % is only about 240 nΩ·m, which is about 10% higher than the resistivity of the CrMo/Cr film. In terms of resistivity, therefore, it can be safely said that the MoCr (Cr≦5 weight %) film is equivalent to CrMo/Cr films. Hence, we have searched for candidate materials within the range of MoCr (1.5≦Cr≦5 weight %).

FIG. 19 shows the relationship between the rate of MoCr alloy etching with a mixture of phosphoric acid, nitric acid, and acetic acid, and the quantity of the added element (Cr). The etching rate has its own appropriate range. For example, if the etching rate is as great as over 10 nm/sec, the amount of etching cannot be appropriately controlled, since the etching time required becomes too short. Conversely, for example, if the etching time exceeds two minutes, normal patterning may not be achievable since the soundness of the resist cannot be obtained. In addition, the machine cycle time tends to increase, which is not preferable in terms of production efficiency. In the range of MoCr ($1.5 \leq Cr \leq 5$ weight %), etching rates fall within an 8.0–1.7 nm/sec range, and for the reasons mentioned above, this etching rate range is approximately appropriate. In the range of MoCr ($Cr \geq 5$ weight %), however, the etching time required for a standard wiring film thickness of 200 nm exceeds two minutes. Etching in the range of MoCr ($Cr \geq 5$ weight %), therefore, is not preferable for the reasons mentioned above.

FIG. 20 shows changes in the amount of MoCr side etching with a mixture of phosphoric acid, nitric acid, and acetic acid. The amount of side etching decreases as the Cr content in the MoCr alloy is increased. In consideration of photolithographic resolution and developing process, to obtain thin film transistors 7 μm or less in channel length, the amount of side etching needs to be controlled to below 1 μm, as will be described later with reference to an embodiment of the present invention. The Cr content in the MoCr alloy, therefore, needs to be 2 weight % or more, and in view of its fluctuations, this value should desirably be 2.5 weight % or more. Even for an MoCr-alloyed double-layer film lamination whose lower layer is made of a 180 nm-thickness Mo-2.5 weight %Cr alloy and whose upper layer is made of a 20 nm-thickness Mo-1.6 weight %Cr alloy, the amount of side etching was almost the same as that of the Mo-2.5 weight %Cr alloy.

FIGS. 21(a) to 21(c) show examples of the cross-sectional shapes of the wiring which was obtained from MoCr alloy etching with a mixture of phosphoric acid, nitric acid, and acetic acid. When the Cr content in the MoCr alloy is 1.6 weight % as shown in FIG. 21(a), the wiring obtained takes almost a vertical cross-sectional shape. When the Cr content in the MoCr alloy is 2.5 weight % as shown in FIG. 21(b), a shape of about 30 degrees in taper angle is obtained. For LCD units of the IPS type, it is known that, as will be described later with reference to an embodiment of the present invention, when the wiring of the pixel electrodes has a vertical cross-sectional shape, there occurs a display nonuniformity ascribable to the rubbing process for alignment layers. For this purpose, therefore, Mo-1.6 weight %Cr is inappropriate. As shown in FIG. 21(c), wiring with a cross-sectional shape of about 30 degrees in taper angle was also obtained in the MoCr-alloyed double-layer film lamination whose lower layer is made of a 180 nm-thickness Mo-2.5 weight %CR alloy and whose upper layer is made of a 2.0 nm-thickness Mo-1.6 weight %CR alloy. Although, at this taper angle, the Mo-2.5 weight %Cr single-layer film creates a more significant in-plane nonuniformity than the film lamination shown in FIG. 21(c), the Mo-2.5 weight %Cr single-layer film can also be put into practical use without a problem.

FIG. 15 also shows the contact resistance values of Mo-2.5 weight %Cr alloyed films with respect to ACF. These values are much smaller than those of a CrMo/Cr film, and are not inferior to a p-ITO sheathed film. It is therefore possible for COG mounting to be implemented using the terminals where an Mo-2.5 weight %Cr alloyed film and ACF are brought into direct contact.

It can be synthetically judged from the above materials data that the film materials that satisfy requirements (1) to (7) are a molybdenum-alloyed film having a chromium content from 2 weight % or more, but up to 5 weight %, and a molybdenum-alloyed film lamination consisting of a first electroconductive film and a second electroconductive film, with the first electroconductive film having a chromium content from 2 weight % or more, but up to 5 weight %, and the second electroconductive film being provided above the first electroconductive film and being smaller in chromium content than the first electroconductive film. The use of either such film material enables the production of an LCD unit which is 7 μm or less in terms of thin film transistor channel length, and if the LCD unit is of the IPS type, this unit can be kept free from display nonuniformity ascribable to the film rubbing processes.

According to the present invention, a liquid crystal display (LCD) unit having excellent characteristics can be provided.

DESCRIPTION OF THE PREFERRED EMBODIMENTS (Embodiment 1)

<Equivalent Circuits>

Figure 2:
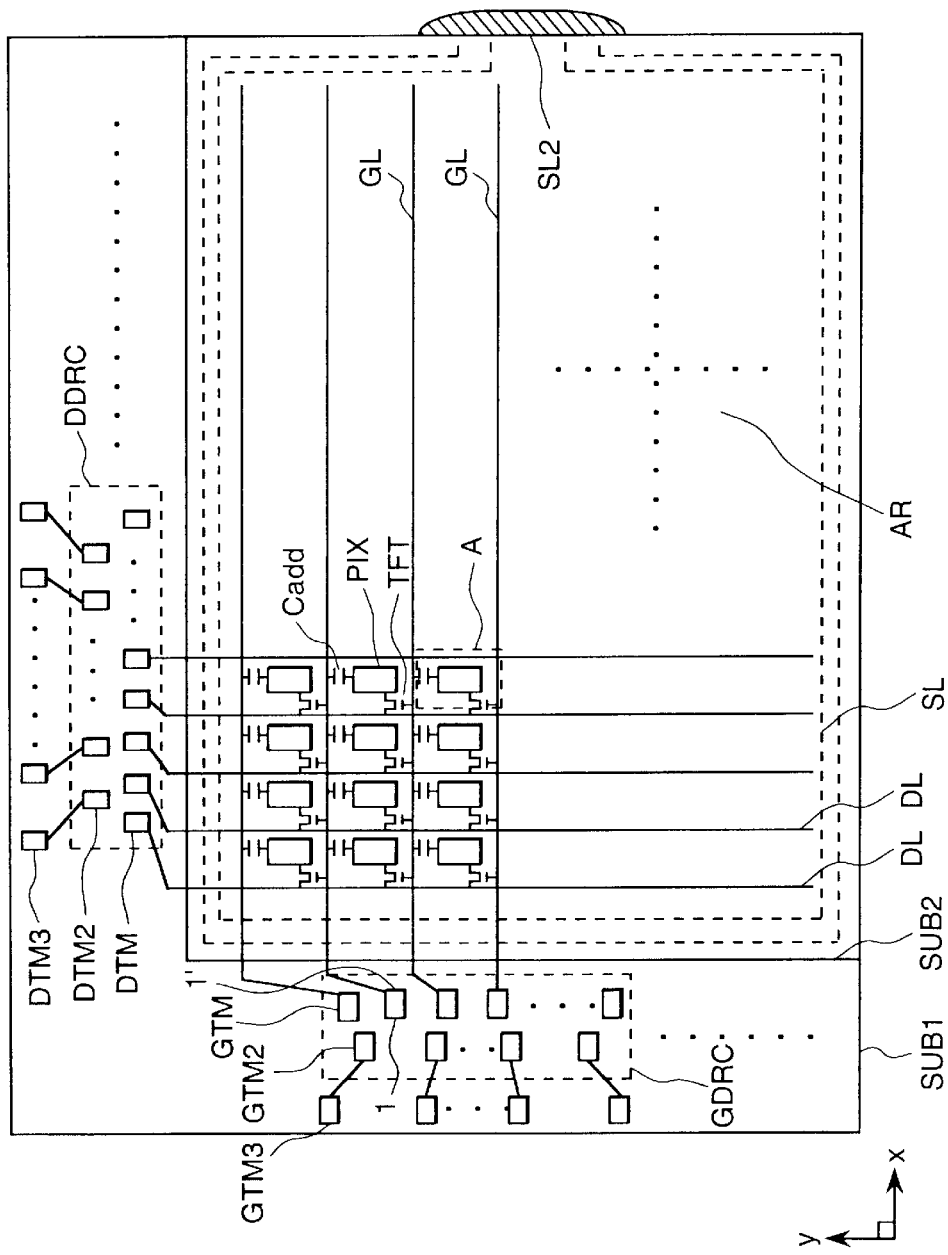
FIG. 2 is an equivalent circuit diagram showing an embodiment of an LCD unit based on the present invention.

FIG. 2 is an equivalent circuit diagram showing one embodiment of an LCD unit based on the present invention. Although this diagram is a schematic circuit diagram, the actual geometrical arrangement of circuit elements is incorporated therein.

Transparent substrate SUB1 in the figure is arranged facing transparent substrate SUB2 via liquid crystals.

Gate lines GL extending in the x-axial direction of the figure and arranged in parallel in the y-axial direction thereof, and drain lines DL extending in the y-axial direction and arranged in parallel in the x-axial direction, are formed on the liquid crystal side of said transparent substrate SUB1. The rectangular areas surrounded by these signal lines function as pixel areas, and this set of pixel areas constitutes display section AR.

Thin film transistor TFT, which is driven by the scanning signal (voltage) supplied from one gate line GL, and pixel electrode PIX, to which a data signal (voltage) is supplied from one drain signal line DL via said thin film transistor TFT, are formed in each pixel area.

Between pixel electrode PIX and the other gate signal line GL adjacent to said gate line GL, there is formed a capacitor Cadd, by which the signal to pixel electrode PIX is stored for a long time when said thin film transistor TFT turns off.

Pixel electrode PIX in each pixel area generates an electric field between opposed electrodes CT (not shown in the figure) formed in common over each pixel area at the liquid crystal side of the other transparent substrate SUB2 facing the SUB1 substrate via liquid crystals, and thus the light transmittance of the liquid crystals between the electrodes is controlled.

One end of each gate line GL leads to one side (in the figure, left) of the transparent substrate, and the terminal portion GTM for connection to bumps at the output sides of semiconductor integrated circuit chip GDRC, consisting of the vertical scanning circuits on said transparent substrate SUB, is formed at the end of GL. Similarly, one end of each drain signal line DL leads to one side (in the figure, top) of the transparent substrate SUB1, and terminal portion DTM for connection to bumps at the output sides, semiconductor integrated circuit chip DDRC, consisting of the data signal driving circuits on said transparent substrate SUB1, is formed at the end of DL.

The semiconductor integrated circuit chips GDRC and DDRC themselves are completely mounted on transparent substrate SUB1, and this mounting method is termed "COG" (Chip-on-Glass).

Each bump at the input sides of semiconductor integrated circuit chips GDRC and DDRC is also provided so as to be connected to terminal portions GTM2 and DTM2, respectively, that are formed on transparent substrate SUB1, and these terminal portions GTM2 and DTM2 are provided so as to be connected to terminal portions GTM3 and DTM3, respectively, that are arranged at the nearest peripheral edge of transparent substrate SUB1 via each wiring layer.

This COG method has the features that bumps can be formed excessively close to each other at the output sides of semiconductor integrated circuit chips GDRC and DDRC, and thus that the terminal portion GTM of each gate line GL and the terminal portion DTM of each drain line DL can also be formed excessively close to each other.

For these reasons, not only the bumps at the output sides of semiconductor integrated circuit chips GDRC and DDRC, but also the terminal portion GTM of each gate line GL and the terminal portion DTM of each drain line DL occupy an excessively small area, and this creates a situation in which increases in connection resistance between these bumps and terminal portions GTM and DTM cannot be disregarded.

Transparent substrate SUB2 is arranged so as to face transparent substrate SUB1 in such a manner that the substrate SUB2 does not interfere with the semiconductor integrated circuits, and the area occupied by the substrate SUB2 is smaller than that of the substrate SUB1.

Transparent substrate SUB1 is secured to transparent substrate SUB2 by sealing material SL formed around the substrate SUB2, and this sealing material also functions as the sealer for the liquid crystals located between transparent substrates SUB1 and SUB2.

Although the above description applies to LCD units that use the COG method, the present invention can also be applied to LCD units that use the TCP method. The TCP method refers to the formation of semiconductor integrated circuits in tape carrier package form, and the output terminals of these semiconductor integrated circuits are connected to the terminals provided on transparent substrate SUB1, and the input terminals are connected to the terminals on a printed circuit board provided near transparent substrate SUB1.

<Pixel structure>

Figure 1:
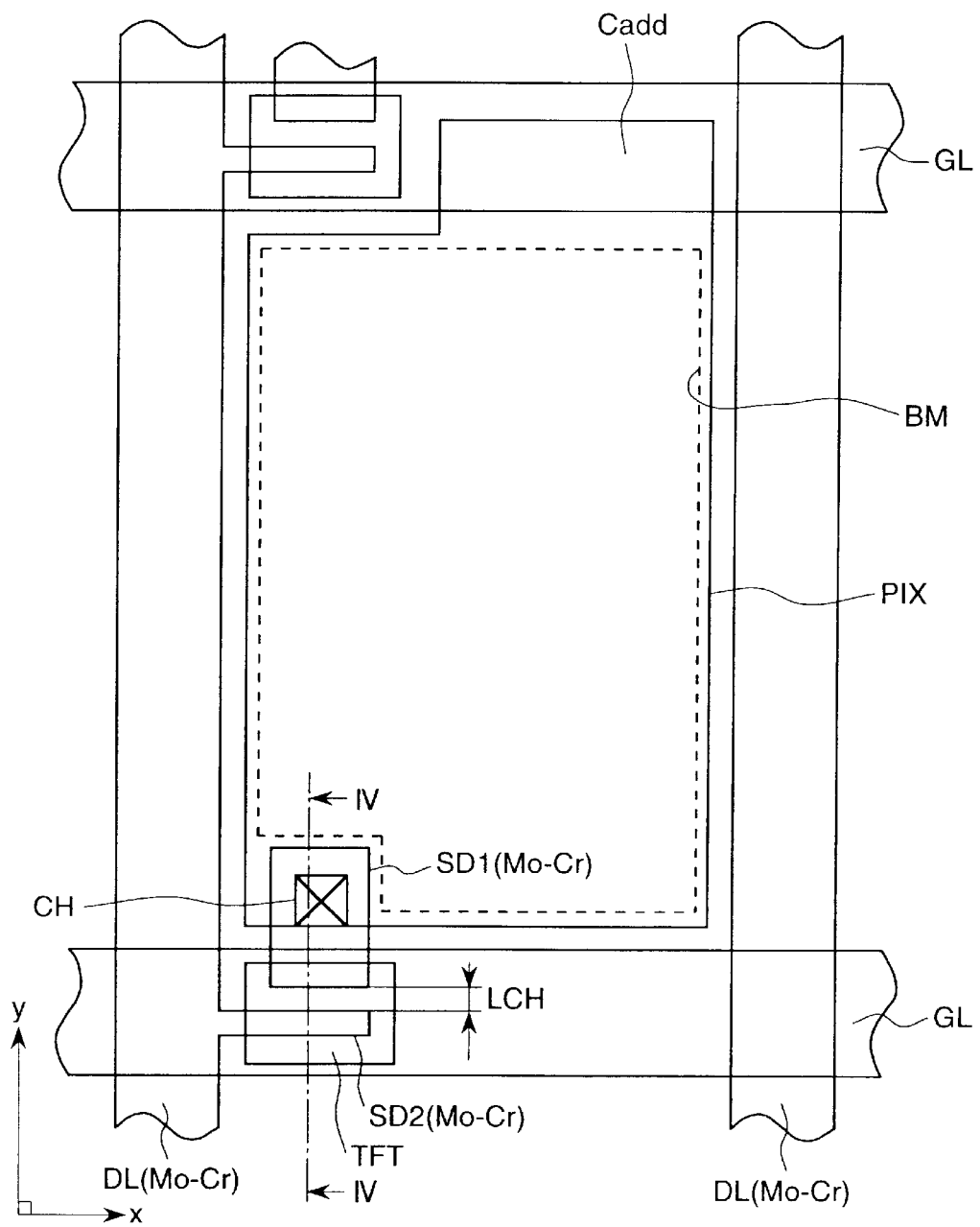
FIG. 1 is a plan view showing an embodiment of the pixel structure in an LCD unit based on the present invention.

FIG. 1 is a plan view showing the structure of one pixel area on transparent substrate SUB1, and this figure corresponds to the section enclosed in dotted-line frame A of FIG. 2.

Figure 3:
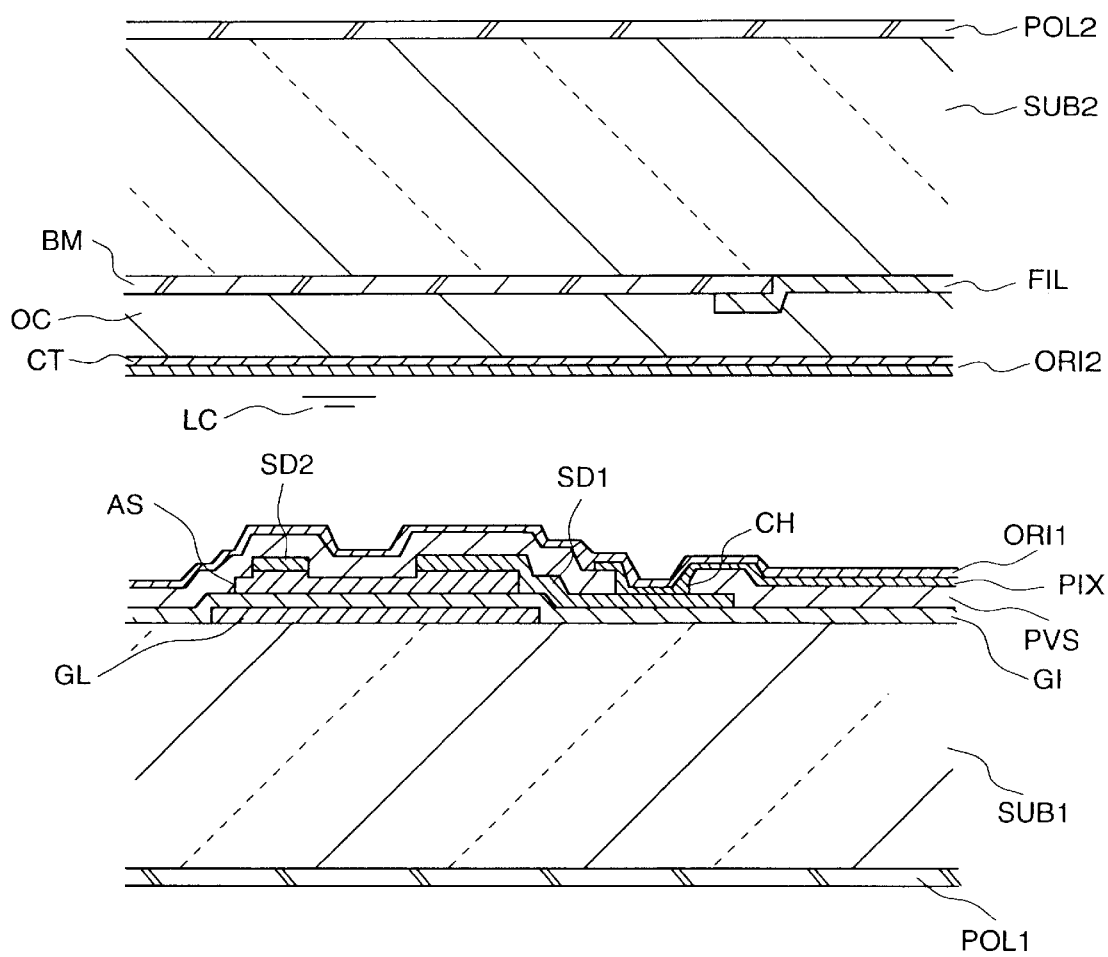
FIG. 3 is a cross-sectional view taken along line IV–IV' in FIG. 1.

FIG. 3 is a cross-sectional view taken along line IV–IV' in FIG. 2 and is also a cross-sectional view of the transparent substrate SUB2.

Gate lines GL extending in the x-axial direction of the figure and arranged in parallel in the y-axial direction thereof are formed at the liquid crystal side of the transparent substrate SUB1 in FIG. 1.

In this embodiment, gate lines GL are of double-layer structure, in which the lower layer is made of an Al—Nd alloy and the upper layer is made of an Mo—Zr alloy.

Such double-layer structure is employed to enable resistance values to be reduced significantly, for the cross section of the corresponding wiring to be tapered during etching, and as will be described later, for gate terminals GTM2 and GTM3 and drain terminals DTM2 and DTM3 to be reduced in contact resistance. The effectiveness of the double-layer structure in other aspects as well will be made obvious in the later description.

An insulating film GI made of SiN, for example, is formed on the surface of transparent substrate SUB1 so that gate lines GL are also sheathed.

Above-mentioned insulating film GI functions as an interlayer insulating film between the drain line DL, to be described later, and gate line GL, as a gate insulator for the thin film transistor TFT, to be described later, and as a dielectric film for the capacitor Cadd, to be described later.

Intrinsic semiconductor layer AS made of a-Si, for example, is formed at the overlapping section with respect to gate line GL at the bottom left of the pixel area. (Semiconductors not doped with any electroconductive-type determinate impurities are referred to as semiconductors of the intrinsic type or the i-type in short.)

The i-type semiconductor layer AS, when provided with a source electrode and a drain electrode on the surface, functions as the semiconductor layer for an MIS type of thin film transistor TFT whose gate electrode forms part of said gate line.

The source electrode SD1 and drain electrode SD2 of this MIS-type thin film transistor TFT are formed at the same time a drain line DL is formed on said insulating film GI.

That is to say, a plurality of drain lines DL extending in the y-axial direction of the figure and arranged in parallel in the x-axial direction thereof are formed, and some of these drain lines are formed so as to extend to the surface of said semiconductor layer AS in order to form each such extension as the drain electrode SD2 of thin film transistor TFT.

Also, at this time, the electrode distanced from said drain electrode SD2 functions as source electrode SD1. In order to ensure that this source electrode SD1 is connected to the pixel electrode PIX, to be described later, slightly extending source electrodes are patterned in the middle of the pixel area.

At the interface between drain electrode SD2 and the semiconductor layer AS of the source electrode SD1, there is formed another semiconductor layer doped with impurities, and this semiconductor layer functions as a contact layer.

After said semiconductor layer AS has been formed, a thin film semiconductor layer doped with impurities is formed on the surface of the semiconductor layer AS, and then drain electrode SD2 and source electrode SD1 are formed. The impurity-doped semiconductor layer, which is exposed from both said electrodes, is etched using these electrodes as masks, with the result that the thin film transistor structure described earlier can be achieved.

To provide the LCD unit with higher resolution and higher performance, it is necessary to implement two factors at the same time: (A) increasing the amount of turn-on current of thin film transistor TFT, and (B) reducing the wiring load.

The reason why the former requirement (A) must be satisfied is that, since an increase in resolution reduces the selection time per scanning line, the turn-on current needs to be sufficiently increased to fully charge the pixel electrode PX with a data signal voltage. Likewise, for the latter requirement (B), since an increase in resolution increases the number of crossing points between the scanning wiring and the data wiring, the capacity at each crossing point must be reduced to inhibit image quality deterioration due to a wiring delay.

In accordance with the present invention, the above two requirements can be satisfied by limiting the channel length LCH of thin film transistor TFT to 7 $\mu$m or less.

The channel length LCH of the thin film transistor denoted by the symbol TFT in the pixel area of FIG. 1 is the distance between drain electrode SD2 and source electrode SD1. Also, the channel width WCH is the length of drain electrode SD1 or the length of source electrode SD2, whichever is the shorter, in a direction orthogonal to channel length LCH.

It is generally known that the turn-on current of thin film transistor TFT varies inversely in proportion to its channel length LCH and varies directly with its channel width WCH. The method of increasing the turn-on current is by reducing the channel length LCH or increasing the channel width WCH. If the channel width WCH is increased, there will occur a side effect in that the resulting increases in the areas of both the drain electrode SD1 and the source electrode SD2 will increase the overlapping area with respect to the scanning wiring and hence increase the wiring load capacity, which is contradictory to the aforementioned requirement (B). It can therefore be seen that reducing the channel length LCH is preferable to satisfy requirement (B) as well. More specifically, the channel length LCH needs to be limited to 7 $\mu$m or less.

Channel length LCH is determined as follows:

In accordance with the present invention, as will be described later, general photolithography is used to create wiring patterns. Therefore, after metallic SD1 and SD2 films have been formed on the entire substrate by spattering or the like, photoresist coating and exposure and development are provided to create the shape of transistor TFT. At this time, the length of the section corresponding to the channel length LCH that has been formed by photoresist processing is taken as LCHR (not shown in the figure). Next, sections not coated with the photoresist are removed by wet etching, wherein side etching slightly progresses from the photoresist patterns. As a result of the side etching process, the created SD1 and SD2 patterns are correspondingly smaller than the shape of the photoresist. Accordingly, channel length LCH increases by this difference. If the amount of side etching is taken as SEL, LCH will be the length calculated using expression 1 shown below.

[Expression 1]

$$LCH = LCHR + SEL \times 2 \qquad \text{Expression 1}$$

where LCHR has its minimum value almost determined by the resolution of the optical exposure unit used in photolithography. The resolution depends on the particular circuit board size. In the case of LCD unit manufacturing equipment, the resolution ranges from 0.5 to 4.0 $\mu$m. To enable the production especially of a large-size high-resolution LCD unit with high throughput, a circuit board size of at least 550 mm×650 mm is required and the resolution in this case will be about 4 $\mu$m. Also, the minimum LCHR value may need to be increased to a trifle larger than that actually required, not dependent on resolution, in order to prevent the occurrence of dot defects due to defective patterning likely to result if electrodes SD1 and SD2 are short-circuited by the possible existence of dust particles in the manufacturing equipment.

After this, to reduce the channel length LCH to 7 $\mu$m or less, it is necessary to reduce SEL, the amount of side etching, to a certain extent and minimize its fluctuations, and thus to select the appropriate materials for the electrodes SD1 and SD2. A molybdenum-alloyed film having a chromium content from 2 weight % or more, but up to 5 weight %, and a molybdenum-alloyed film lamination consisting of a first electroconductive film and a second electroconductive film, wherein the first electroconductive film has a chromium content from 2 weight % or more, but up to 5 weight %, and the second electroconductive film is provided above the first electroconductive film and contains less chromium than the first electroconductive film does, are the materials that are small in the amount of side etching and suitable for the electrodes SD1 and SD2. Also, Mo—Cr, because of its resistivity being almost the same as that of Cr, is effective for reducing the contact resistance of drain terminals DTM, as will be described later. Effectiveness in other aspects will also be made obvious in the later description.

On the surface of transparent substrate SUB1 where drain lines DL (drain electrode SD2 and source electrode SD1) have thus been formed, a passivation film PSV made of SiN, for example, is formed covering said drain lines DL and the like.

This passivation film PSV is provided to avoid direct contact between thin film transistor TFT and the liquid crystals, and contact hole CH is formed to expose a portion of the extension from the source electrode SD1 of said thin film transistor TFT.

Transparent pixel electrode PIX made of IZO (indium zinc oxide), for example, is also formed on the surface of passivation film PSV so as to cover a large portion of the pixel area.

This pixel electrode PIX is formed so that it also covers the contact hole CH of passivation film PSV, and thus, this pixel electrode is connected to the source electrode SD1 of thin film transistor TFT.

Furthermore, on the surface of transparent substrate SUB1, where pixel electrode PIX has thus been formed, alignment film ORI1 is formed so that it also covers said pixel electrode PIX. Alignment film ORI1 is made of resin, for example, and its surface is subjected to rubbing in a fixed direction. Also, alignment film ORI1 is in contact with liquid crystal LC and determines the initial orientation of this liquid crystal.

Polarizer POL1 is mounted on the opposite side to liquid crystal LC on transparent substrate SUB1.

On the liquid crystal side of transparent substrate SUB2, black matrix BM is so formed as to separate each pixel area.

Black matrix BM is provided to avoid the emission of external light to thin film transistor TFT and to optimize display contrast.

In addition, color filters FIL that have colors corresponding to each pixel area are formed at the hole of black matrix BM, and this hole functions as the essential pixel area where light can be transmitted.

Filters of the same color, for example, are used as color filters FIL in each pixel area provided in parallel in the y-axial direction, and filters of red (R), green (G), and blue (B), for example, are arranged repeatedly in sequence for each pixel area in the x-axial direction.

On the surface of transparent substrate SUB2 where black matrix BM and color filters FIL have thus been formed, planarization film OC for covering said black matrix BM as well and made of a resin coating, for example, is formed and the surface of this film is so created as to be free from significant undulations associated with the formation of black matrix BM and color filters FIL.

Opposed electrode CT common to each pixel area and made of ITO, for example, is also formed on the surface of planarization film OC.

The opposed electrode CT controls the transmittance of light by generating an electric field corresponding to the particular data level (voltage), between the CT and the pixel electrodes PIX in each pixel area, and controlling the orientation of the liquid crystal LC between these electrodes under the appropriate combination of aforementioned polarizer POL1 and the polarizer POL2 to be described later.

Furthermore, on the surface of transparent substrate SUB2, where opposed electrode CT has thus been formed, alignment film ORI2 is formed so that it also covers said opposed electrode CT. Alignment film ORI2 is made of resin, for example, and its surface is subjected to rubbing in a fixed direction. Also, alignment film ORI2 is in contact with liquid crystal LC and determines the initial orientation of this liquid crystal.

Polarizer POL2 is mounted on the opposite side of liquid crystal LC on transparent substrate SUB1.

<Structure of the Terminal Portions>

Figure 4A:
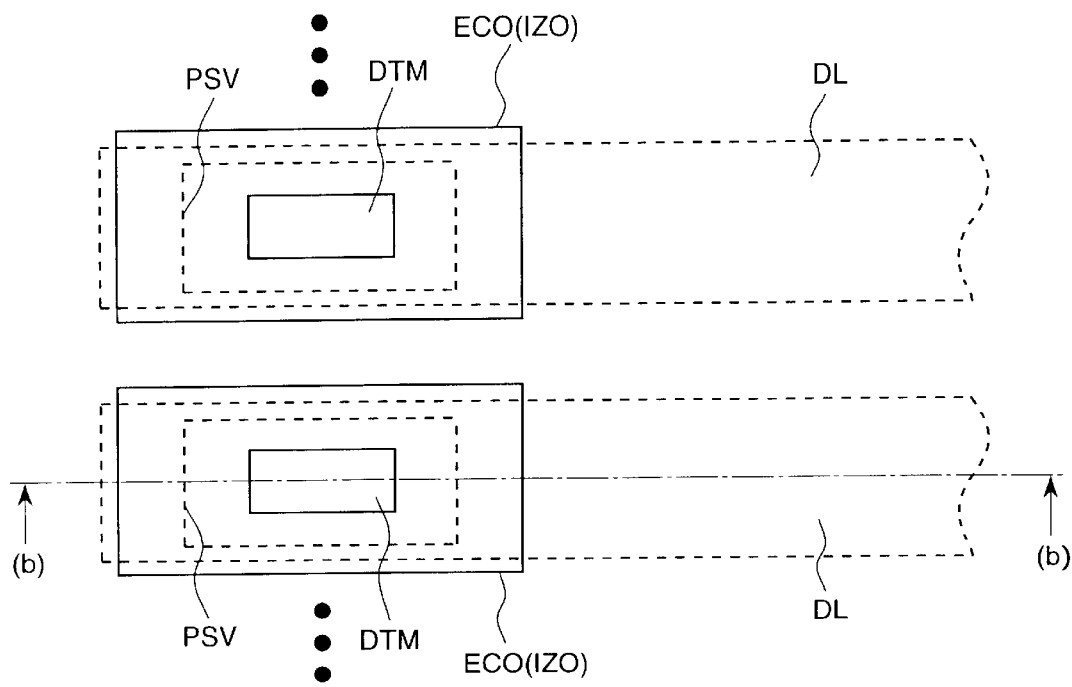
FIG. 4(a) is a plan view of a (terminal portion) showing an embodiment of an LCD unit based on the present invention.
Figure 4B:
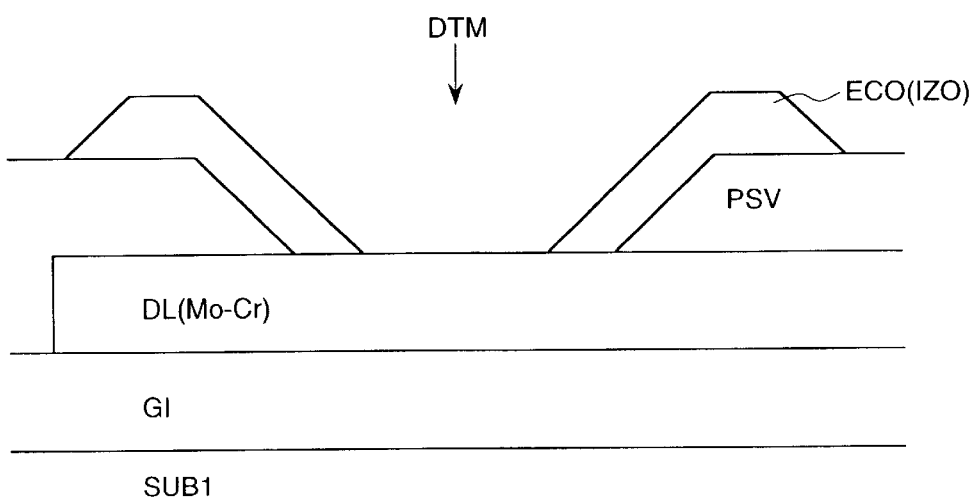
FIG. 4(b) is a cross-sectional view taken along line (b)—(b) in FIG. 4(a).

FIGS. 4(a) and 4(b) show the aforementioned drain terminal portion DTM. FIG. 4(a) is a plan view of two of the multiple drain terminal portions DTM formed in parallel, and FIG. 4(b) is a cross-sectional view taken along line b–b' in FIG. 4(a).

Drain lines DL extended from display section AR are formed on the surface of transparent substrate SUB1.

Each of drain lines DL is made of either a molybdenum-alloyed film having a chromium content from 2 weight % or more, but up to 5 weight %, or a molybdenum-alloyed film lamination consisting of a first electroconductive film and a second electroconductive film, with the first electroconductive film having a chromium content from 2 weight % or more, but up to 5 weight %, and the second electroconductive film being provided above the first electroconductive film and containing less chromium than the first electroconductive film does. Hereinafter, such films will be referred to as Mo—Cr films.

The drain line DL, although initially covered with a passivation film PSV that is made of SiN, is exposed from said passivation film PSV by the holing of this film in the formation area of the drain terminals.

It is preferable that the holing of passivation film PSV in this case should be executed using a dry-etching gas that contains fluorine. Compared with wet etching, dry etching provides excellent accuracy and processing time controllability and is therefore advantageous for purposes such as providing holes in terminals and processing the contact holes in pixel sections. Also, since the Mo—Cr film used to form drain signal lines DL is high in dry-etching resistance, this film is not removed during etching.

Electroconductive oxide film ECO made of IZO (indium-zinc oxide), for example, is laminated on the periphery of the exposed portion of the Mo—Cr signal line DL in the terminal formation area, except in the middle of this portion.

In other words, electroconductive oxide film ECO is formed over the passivation film PSV located on the periphery of the hole, and leads to the side walls of this passivation film and to the top of drain signal line DL. The middle of the drain line DL exposed by the provision of said hole is constructed so as not to be covered with said electroconductive oxide film ECO.

That is to say, in the middle of the terminal portion of drain line DL, direct electrical connection to the other electrodes to be connected can be established without the signal wiring being routed through electroconductive oxide film ECO.

Figure 5:
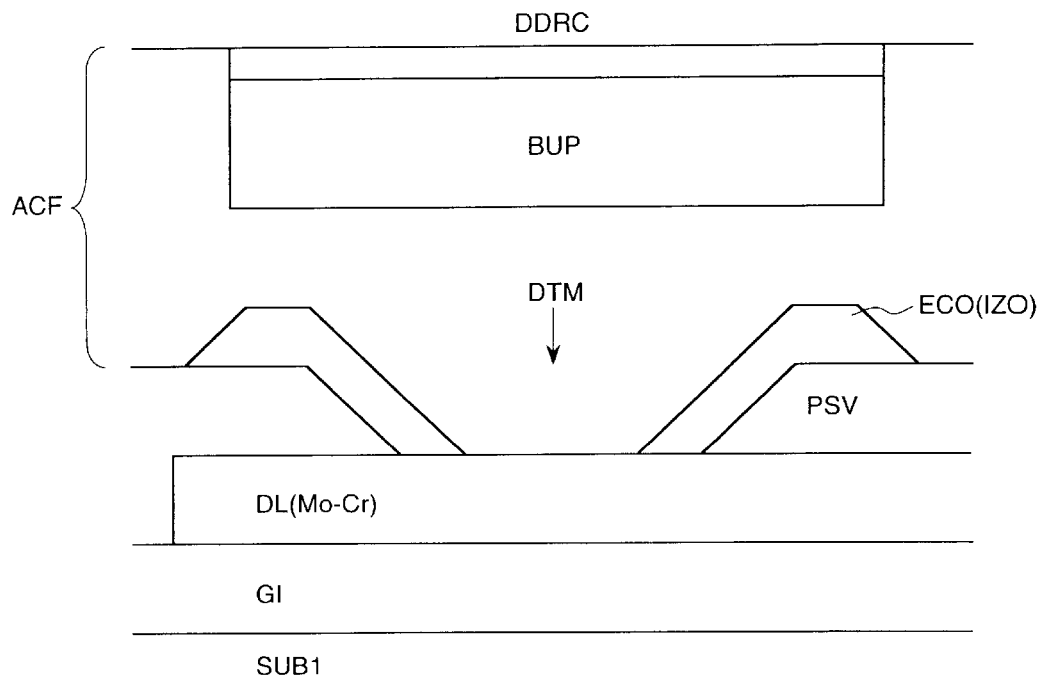
FIG. 5 is a cross-sectional view showing the structure of the connections between the terminals and semiconductor integrated circuit bumps in an LCD unit based on the present invention.

Each terminal portion DTM that has thus been formed is constructed so that, as shown in FIG. 5, it can be connected to the bump BUP on semiconductor integrated circuit DDRC via an anisotropic conductive film (ACF) or sheet. The anisotropic conductive film (ACF) here is a sheet-like resin film containing a multitude of electroconductive particles. This film is inserted between said terminal DTM group and semiconductor integrated circuit DDRC and then undergoes a fixed pressure to establish electrical connection between said bump BUP and the electroconductive members (at one portion, said electroconductive oxide film ECO, and at the other portion, Mo—Cr) of terminal portion DTM via said electroconductive particles.

That is to say, said anisotropic conductive film (ACF) or sheet has, at said terminal portion DTM, an area in which the film or the sheet is to be connected directly to the electroconductive materials constituting drain line DL (in other words, not via electroconductive oxide film ECO), and, as a result, the corresponding connection resistance can be reduced significantly. It has been verified that electrical connection resistance between Mo—Cr and electroconductive oxide film ECO (such as ITO or IZO) becomes relatively small. If drain lines DL are made of an alloy whose principal component is Cr having an Mo content from 0 to 50 weight % (hereinafter, this alloy is referred to as Cr—Mo), the electrical connection resistance between Cr—Mo and electroconductive oxide film ECO (such as ITO or IZO) becomes relatively large and makes COG mounting difficult.

Even if electroconductive oxide film ECO is so formed on the periphery of terminal portion DTM so as not to cover the middle thereof, the occurrence of electrocorrosion at said terminal portion DTM can be sufficiently avoided.

The resin forming the anisotropic conductive film not only functions as a bonding agent between transparent substrate SUB1 and the other component to be secured (in this case, the semiconductor integrated circuit or flexible printed circuit board), but also prevents to a certain extent the potentially electrocorrosion-causative moisture from entering the terminals.

Figure 6:
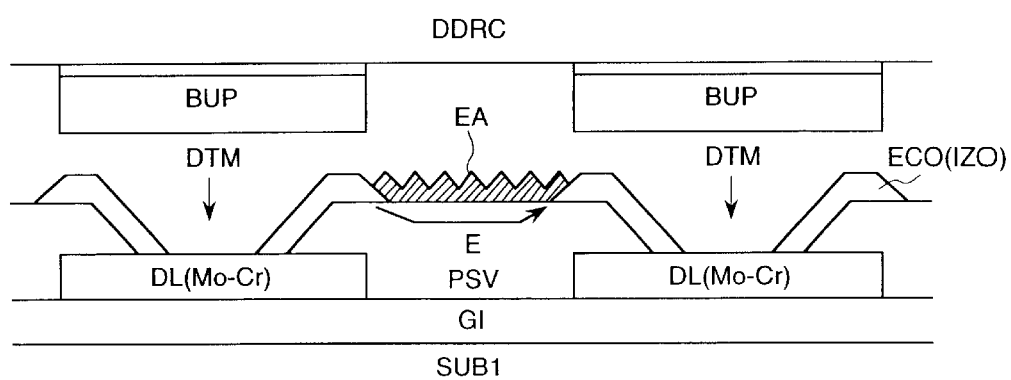
FIG. 6 is a diagram showing how and why terminal portions suffer electrocorrosion due to the electric field generated between a terminal portion and adjacent terminal portions.

FIG. 6 is a view showing two of the several drain terminal portions DTM arranged in parallel and the bumps BUP on the semiconductor integrated circuit DDRC connected to each such drain terminal portion DTM. As aforementioned, anisotropic conductive film ACF is inserted between these circuit elements.

The electrocorrosion of drain terminal portions DTM is an oxidation due to electric field E based on the potential difference that occurs between adjacent terminal portions DTM when water or electrolyte EA, for example, exists therebetween. Hence, since the electroconductive oxide film ECO itself is oxidized, this film functions as an inhibitor of said oxidation, by existing on the periphery of each drain terminal portion DTM. As a result, it becomes possible to inhibit the oxidation of the drain lines DL in the middle (portion not covered with electroconductive oxide film ECO) of the drain terminal portions DTM surrounded by the electroconductive oxide film.

Drain lines DL are made of Mo—Cr. It has been verified that the electrical connection resistance between Mo—Cr and electroconductive oxide film ECO (such as ITO or IZO) becomes relatively small. From this viewpoint as well, therefore, the connection resistances between the terminal portions DTM of drain lines DL and other electrodes can be reduced as a whole.

In this embodiment, the structure of drain terminal portions DTM has been described. Similar structure is also applied to other terminal portions (namely, terminal portions DTM2 at the input side of semiconductor integrated circuit DDRC, terminal portions DTM3 connected to said DTM2 via a wiring layer, gate terminal portions GTM, terminal portions GTM2 at the input side of semiconductor integrated circuit GDRC, and terminal portions GTM3 connected to said GTM2 via a wiring layer), wherein these terminals are connected to gate lines and wiring layers without electroconductive metallic oxide film ECO in the middle of each terminal portion, with the gate lines and wiring layers being made of an Mo—Zr/Al—Nd laminated film. It has been verified that the electrical connection resistance between Mo—Zr and electroconductive oxide film ECO (such as ITO or IZO) becomes relatively small.

<Manufacturing Processes>

One embodiment of the manufacturing processes for the transparent substrate SUB1 of the LCD unit described above will be explained with reference FIGS. 7 to 9. The characters in the middle of these figures denote the abbreviations for process names, the left side denotes the thin film transistor TFT portions shown in the figures, and the right side denotes the flow of the processes corresponding to the cross-sectional view of drain terminal portion DTM in FIG. 4.

Processes A to F, except for processes B and D, are grouped according to the particular type of photolithographic processing, and all cross-sectional views for each process show the phase where the required processing and the removal of the photoresist have been completed following the end of photolithographic processing. The photolithographic processing here refers to a series of operations from photoresist coating, development, then through selective exposure that uses masks, to optical processing, and repetitious description of the photolithographic processing is avoided. Each process group will be described below.

Figure 7:
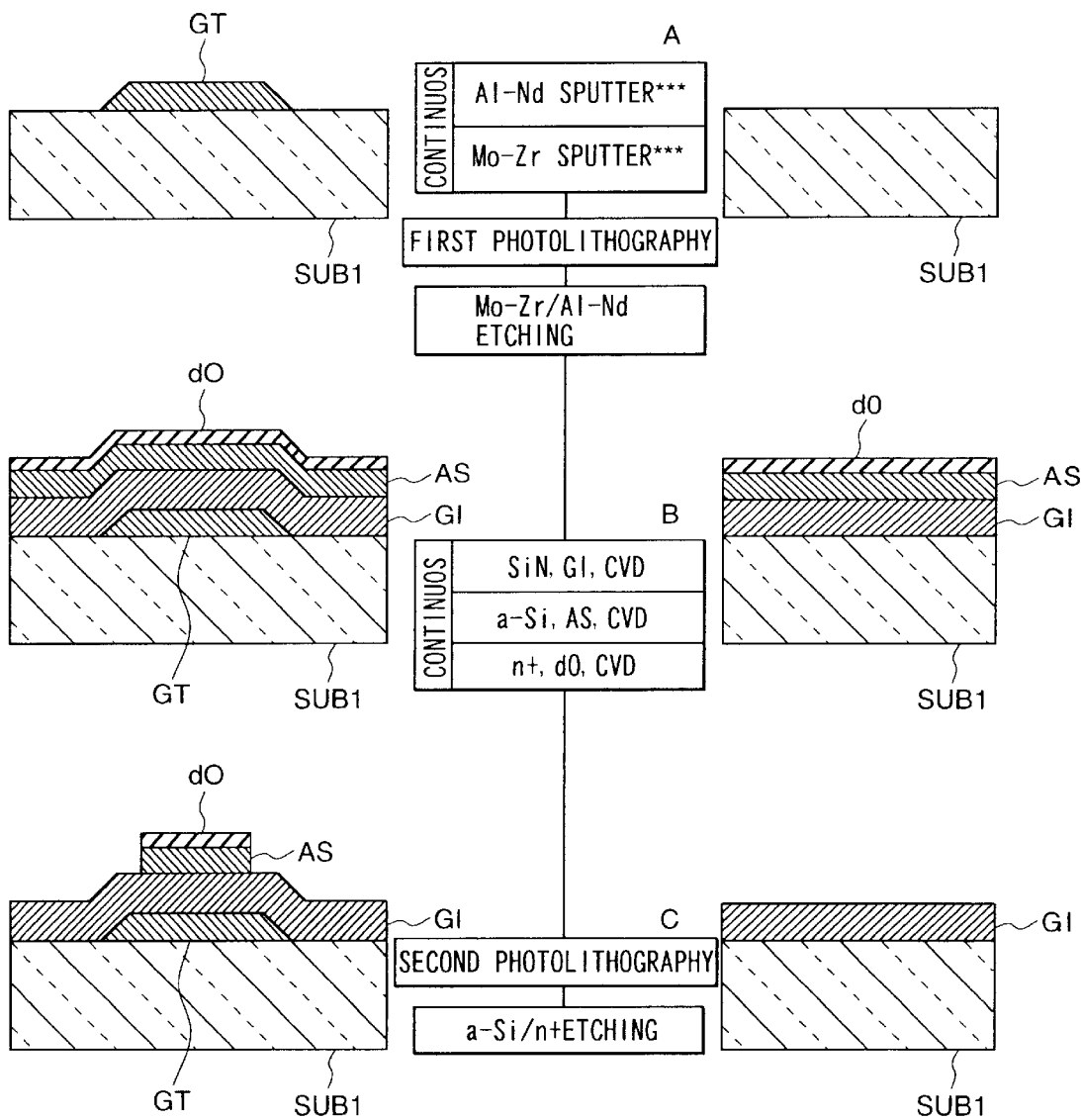
FIG. 7 is a process flow diagram showing an embodiment of the manufacturing process for an LCD unit based on the present invention, and is a drawing integrated with FIGS. 8 and 9.

Process A, FIG. 7

On transparent substrate SUB1 made of AN635 Glass (tradename), an Al—Nd layer with a film thickness of 2,000 Å is first formed by spattering and then an Mo—Zr layer with a film thickness of 400 Å is continuously formed by sputtering. After photolithographic processing, the Mo—Zr and Al—Nd layers are etched both in general and selectively using an etchant consisting of phosphoric acid, nitric acid, acetic acid, deionized water, ammonium fluoride, and so on.

Hereby, gate electrode GT, gate line GL, gate terminal GTM, terminal portion GTM2 at the input side of semiconductor integrated circuit GDRC, terminal portion GTM3 connected to said GTM2 via a wiring layer, terminal portion DTM2 at the input side of semiconductor integrated circuit DDRC, and terminal portion DTM3 connected to said DTM2 via a wiring layer are formed.

Process B, FIG. 7

A silicon nitride film with a thickness of 3,500 Å is provided using ammonia, silane, and nitrogen gases introduced into plasma CVD equipment, then an i-type amorphous silicon film with a thickness of 1,200 Å is formed using silane and hydrogen gases introduced into the plasma CVD equipment, and an N(+)-type amorphous silicon film with a thickness of 300 A is formed using hydrogen and phosphine gases introduced into the plasma CVD equipment.

Process C, FIG. 7

After photolithographic processing, an N(+)-type amorphous silicon film or an i-type amorphous silicon film is selectively etched using $SF_6$ and $CCl_4$ as dry-etching gases to form an island of i-type semiconductor layer AS.

Figure 8:
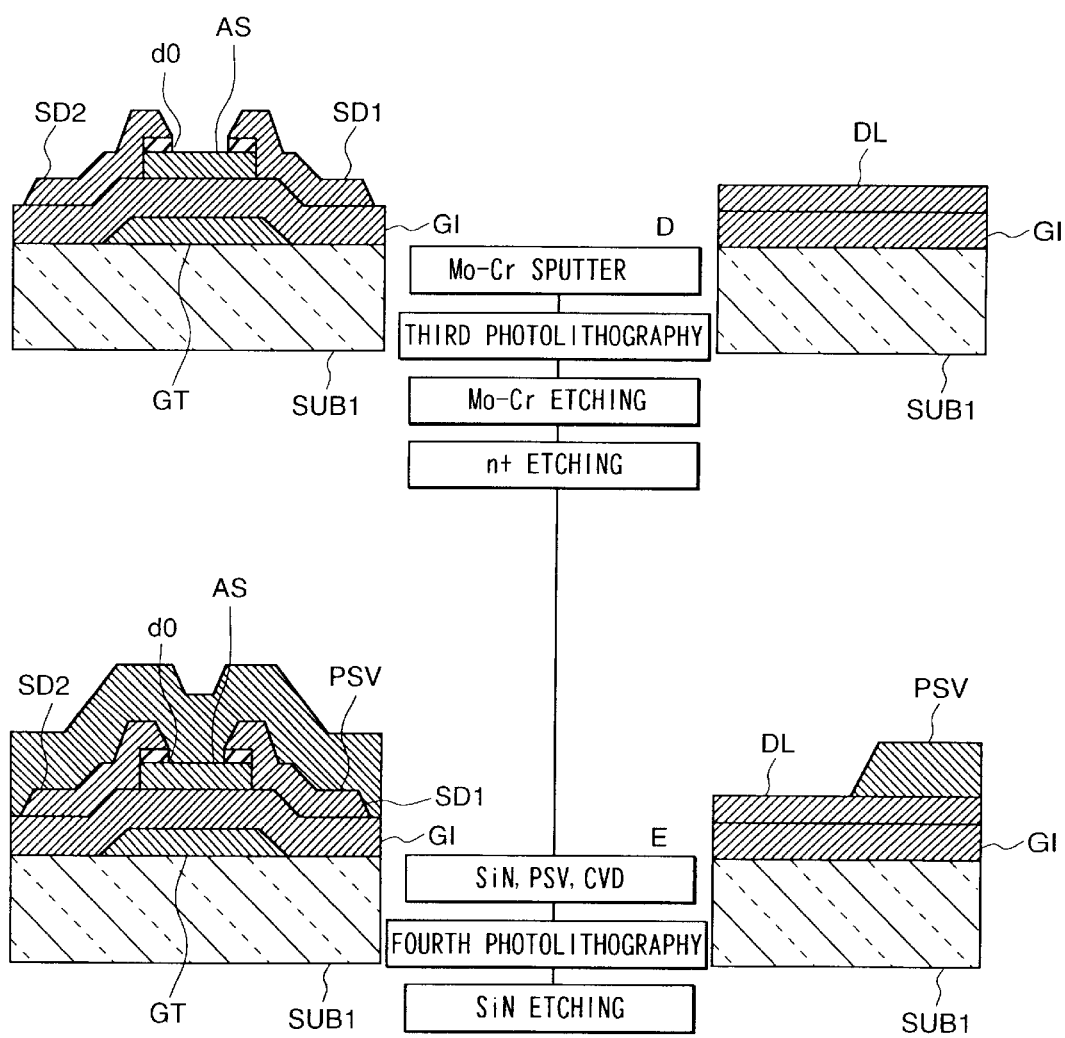
FIG. 8 is a process flow diagram showing further steps of the manufacturing process for an LCD unit based on the present invention, and is a drawing integrated with FIGS. 7 and 9.

Process D, FIG. 8

An electroconductive film with a thickness of 2,000 Å and made of MoCr is formed by spattering. After photolithographic processing, the electroconductive film is etched using an etchant similar to that of process A. Thus, drain line DL, source electrode SD1, drain electrode SD2, and drain terminal DTM are formed.

As aforementioned, MoCr is a molybdenum-alloyed film having a chromium content from 2 weight % or more, but up to 5 weight %, or a molybdenum-alloyed film lamination consisting of a first electroconductive film and a second electroconductive film, with the first electroconductive film having a chromium content from 2 weight % or more, but up to 5 weight % and the second electroconductive film being provided above the first electroconductive film and containing less chromium than the first electroconductive film does.

Although the electroconductive film here can be a triple-layer film consisting of, for example, MoZr/AlNd/MoZr, this composition is not preferable in consideration of the fact that, since a long time is required for film deposition, productivity is low, and that a large-scale deposition apparatus is required and this increases plant investment.

Next, N(+)-type semiconductor layer d0 is selectively removed using $CCl_4$ and $SF_6$ introduced into the dry-etching equipment.

Process E, FIG. 8

A silicon nitride film with a thickness of 0.4 µm is formed using ammonia, silane, and nitrogen gases introduced into the plasma CVD equipment. After photolithographic processing, the silicon nitride film is selectively etched using SF6 as a dry-etching gas to provide passivation film PSV and insulating film GI with patterning. Because of their sufficient dry-etching resistance, MoZr and MoCr are not lost during dry etching with $SF_6$ and thus the silicon nitride film can be selectively etched.

Figure 9:
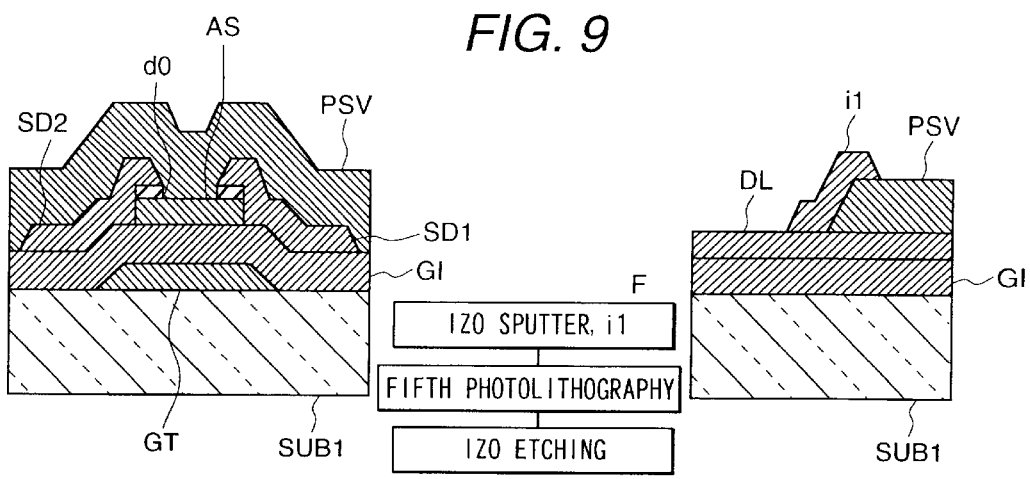
FIG. 9 is a process flow diagram showing still further steps of the manufacturing processes for an LCD unit based on the present invention, and is a drawing integrated with FIGS. 7 and 8.

Process F, FIG. 9

Transparent electroconductive film i1 with a thickness of 1,150 Å and made of IZO (indium zinc oxide) is formed by sputtering. After photolithographic processing, transparent electroconductive film i1 is selectively etched using an etching solution composed mainly of an oxalic acid. Thus, the top layer of gate terminal portion GTM and that of drain terminal portion DTM are formed.

Although IZO is used as transparent electroconductive film i1 in this embodiment, an amorphous ITO film can be used instead.

Since an oxalic acid solution is used as the etchant, IZO and amorphous ITO can be processed without dissolving the Al alloy, Mo alloy, Cr alloy, etc. that are used for other signal lines. Resultingly, the exposed Mo alloy and other alloys of terminal portions GTM, DTM, and so on can be formed without dissolving the exposed alloys themselves, and even if defects are present in passivation film PSV or the like, high production yields can be obtained without dissolving any wiring.

(Embodiment 2)

Figure 10:
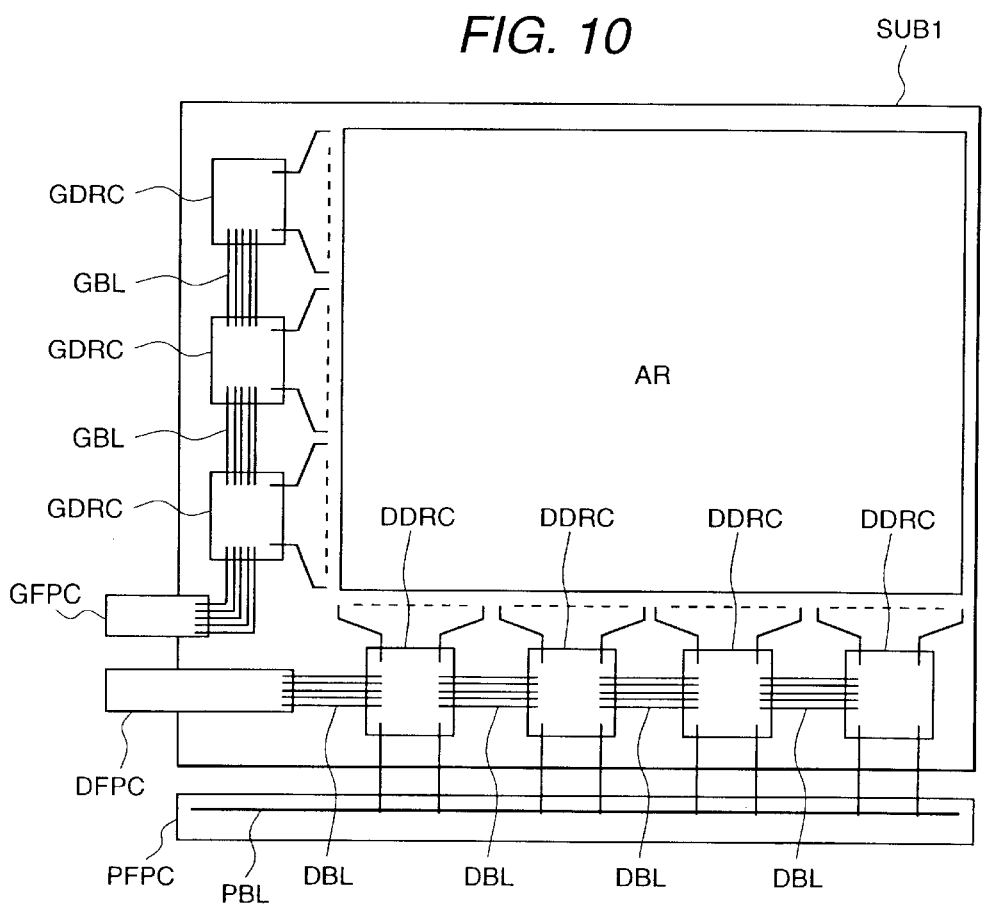
FIG. 10 is a layout view showing an embodiment of an LCD unit based on the present invention.

FIG. 10 shows an example of simplified COG mounting which enables data and the driving supply voltage of semiconductor integrated circuit GDRC to be transferred by electrically connecting semiconductor integrated circuits GDRC and DDRC via bus lines GBL and DBL formed on transparent substrate SUB1.

In FIG. 10, the scanning signals and the driving supply voltage of gate semiconductor integrated circuits GDRC are supplied from gate semiconductor integrated circuit-use flexible printed circuit GFPC via a gate power bus line and scanning signal bus lines GBL. The data is transferred from one to the next gate semiconductor integrated circuit GDRC in sequence, and at the same, signals are written into each gate semiconductor integrated circuit GDRC.

Since the load at the drain line side is heavy, the driving supply voltage of drain semiconductor integrated circuits DDRC is supplied from power supply-use flexible printed circuit PFPC via power bus line PBL. Data are supplied from data-use flexible printed circuit DFPC to drain semiconductor integrated circuit DDRC via data bus line DBL. The data is then transferred from one to the next drain semiconductor integrated circuit DDRC in sequence, and at the same, signals are written into each drain semiconductor integrated circuit DDRC.

Of all power signal lines to gate semiconductor integrated circuits GDRC, the driving power wiring and other wiring are heavily loaded. It may therefore be necessary to provide flexible printed circuits similar to the power supply-use flexible printed circuit PFPC at the drain side. Even in that case, however, since the number of signal lines required will be smaller than in the conventional scheme, it will be possible to reduce the widths of the flexible printed circuits and thus to reduce costs.

The data transfer scheme described above can be implemented by reducing the contact resistances between GDRC and DDRC semiconductor integrated circuit bumps BUP and terminals GTM, GTM2, GTM3, DTM, DTM2, and DTM3, and reducing the resistance values of bus lines GBL and DBL. As described earlier, in this embodiment, not only are bus lines GBL and DBL formed using low-resistance MoZr/AlNd, but also terminals GTM, GTM2, GTM3, DTM, DTM2, and DTM3 are so formed as to ensure direct contact between MoZr and ACF and between DTM and MoCr, with the result that the data transfer scheme can be implemented.

The adoption of this scheme eliminates the necessity for the provision of FPC at the gate side and minimizes the FPC width at the drain side, and these measures enable significant improvement of connection reliability and narrower fringing of the display unit. Further reduction in FPC size enables a reduction in FPC manufacturing costs.

(Embodiment 3)

The structure in which electroconductive oxide films ECO are laminated around the terminal portions can be applied to, for example, all the respective terminal portions of each gate line GL or of each drain line DL.

Instead, it is also possible to apply the above-mentioned structure only to, for example, the terminal portions to be arranged at alternate positions in parallel in proximity, and in this case, an electroconductive oxide film is not to be formed at any other terminal portion.

The above is possible because, in consideration of the fact that the electrocorrosion of terminal portions is an oxidation reaction resulting from the potential difference between adjacent terminal portions, caused by the presence of an electrolyte therebetween, sufficient effects can be obtained at one terminal portion by providing an element (in this embodiment, an electroconductive oxide film) that does not cause said oxidation.

Hence, a terminal portion at which electroconductive oxide film ECO is not formed is present on the periphery of each terminal portion, and at other terminal portions adjacent to that terminal portion, electroconductive oxide film ECO can also be formed on the periphery of the corresponding terminal portion.

Also, an electroconductive oxide film will not always need to be formed at the terminal portions arranged in parallel in proximity, if the average electric field applied between adjacent terminals becomes almost zero. More specifically, these terminals are likely to be, for example, the data output terminals that provide alternating-current signals, or the terminals that provide only digital signal data among all types of signal data to be provided to semiconductor integrated circuits.

(Embodiment 4)

In the above-described embodiment, the so-called vertical electric field type of pixel composition has been explained. The above embodiment is not limited by such pixel composition and can, of course, be applied to, for example, the horizontal electric field type as well.

Figure 11:
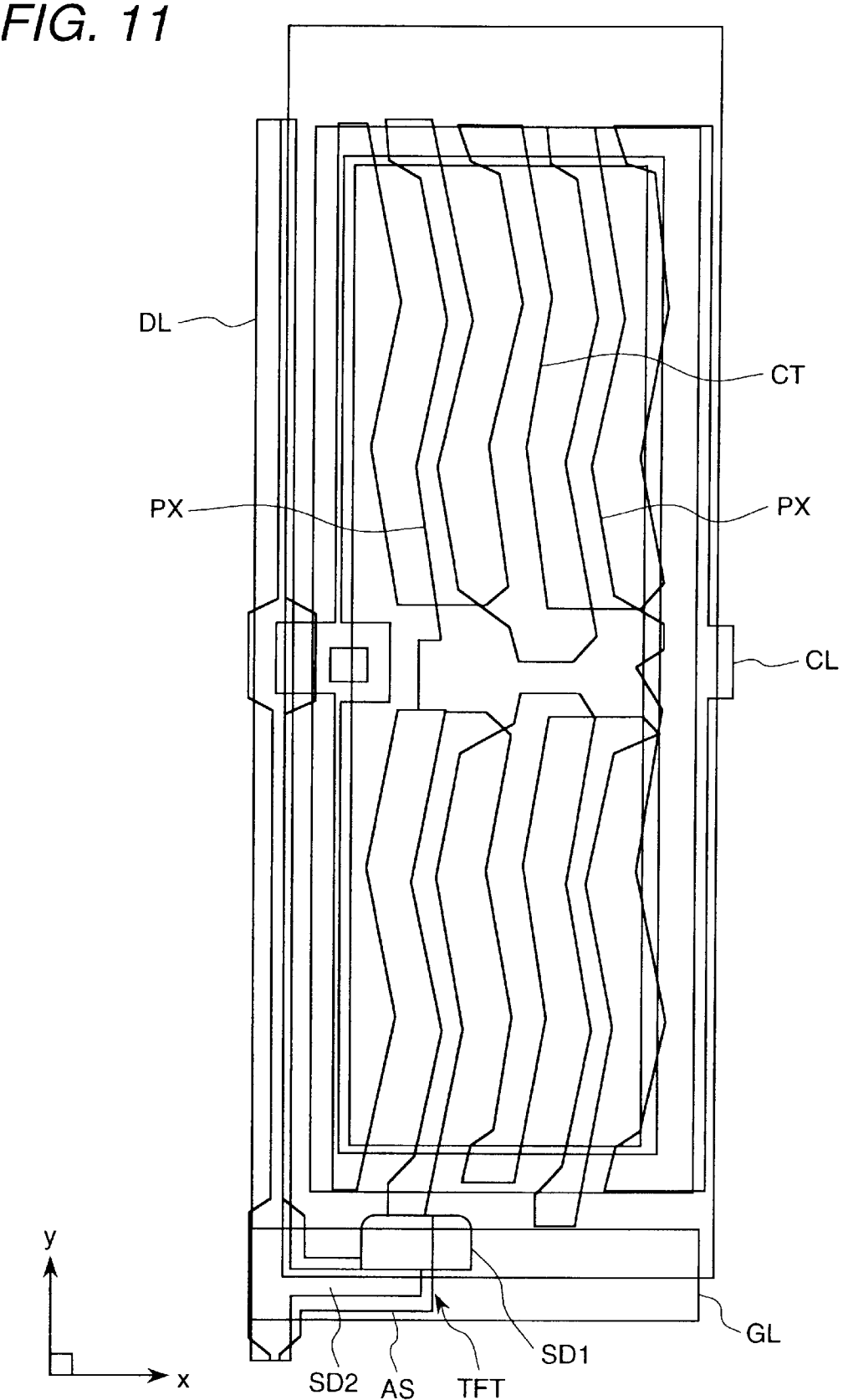
FIG. 11 is a plan view showing another embodiment of the pixel structure in an LCD unit based on the present invention.

FIG. 11 is a plan view showing an embodiment of the horizontal electric field type of pixel composition in an LCD unit.

In this type of pixel composition, opposed electrodes CT are formed at the liquid crystal side of transparent substrate SUB1 on which pixel electrodes PX are formed, and each of these electrodes is arranged alternately in a stripe pattern (in this figure, in a form extending in the y-axial direction of the figure).

Pixel electrodes PX and opposed electrodes CT are formed on different layers via an insulating film, and of all electric fields generated therebetween, only an electric field having components almost parallel to those of transparent substrate SUB1 controls the light transmittance of the liquid crystals.

Each electrode has a plurality of curves in its extending direction because it employs the so-called multi-domain scheme in which two areas different in the direction of the electric field generated between pixel electrode PX and opposed electrode CT are formed and the occurrence of changes in color tone during viewing from different directions with respect to the display screen is avoided.

Each pixel area is formed in an area surrounded by the gate lines GL extending in the x-axial direction and arranged in parallel in the y-axial direction and the drain lines DL extending in the y-axial direction and arranged in parallel in the x-axial direction; and, although, in terms of the fact that they are connected to pixel electrodes PX via thin film transistors TFT, drain signal lines DL are of the same structure as in FIG. 1, they differ in that opposed-electrode signal line CL for supplying opposed voltage signals to each opposed electrode CT is formed.

At this time, pixel electrodes PX, drain line DL, and the source electrode SD1 and drain electrode SD2 of the transistor portion are made of either a molybdenum-alloyed film having a chromium content from 2 weight % or more, but up to 5 weight %, or a molybdenum-alloyed film lamination (Mo—Cr) consisting of a first electroconductive film and a second electroconductive film, with the first electroconductive film having a chromium content from 2 weight % or more, but up to 5 weight % and the second electroconductive film being provided above the first electroconductive film and containing less chromium than the first electroconductive film does. As aforementioned, the use of Mo—Cr enables SEL, the amount of its side etching, to be reduced to a certain extent and the channel length LCH to be reduced to 7 $\mu$m or less.

Figure 12:
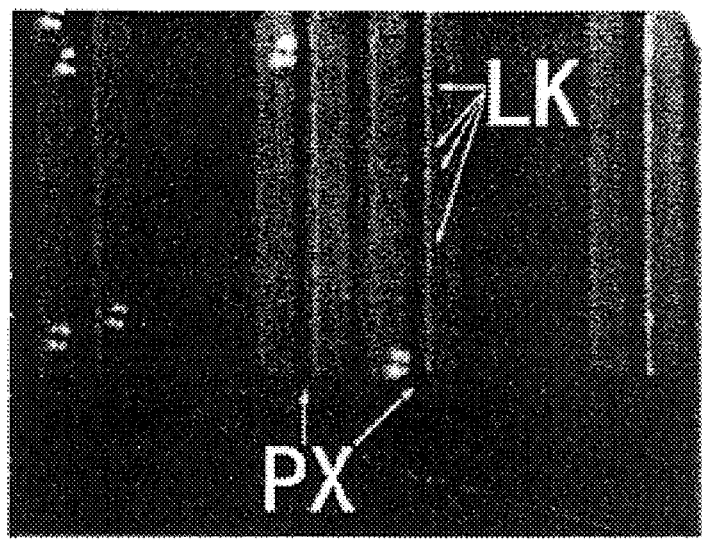
FIG. 12 is a photo showing an example of a display defect in an LCD unit based on the present invention.
Figure 13:
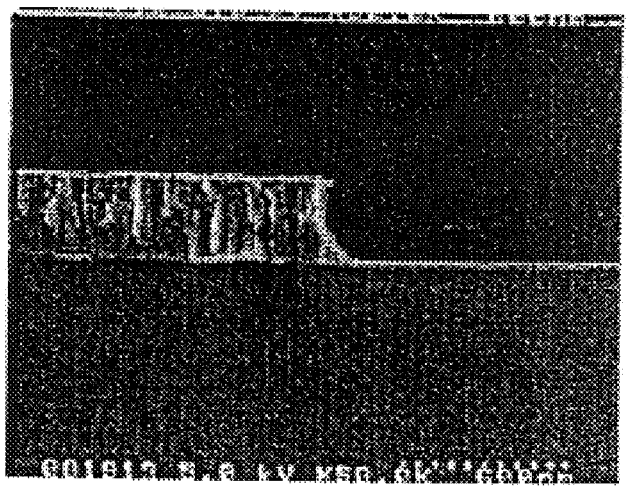
FIG. 13 is a photo showing an example of the cross section of a pixel electrode used in an LCD unit based on the present invention, and also showing the display defect of FIG. 12.
Figure 14:
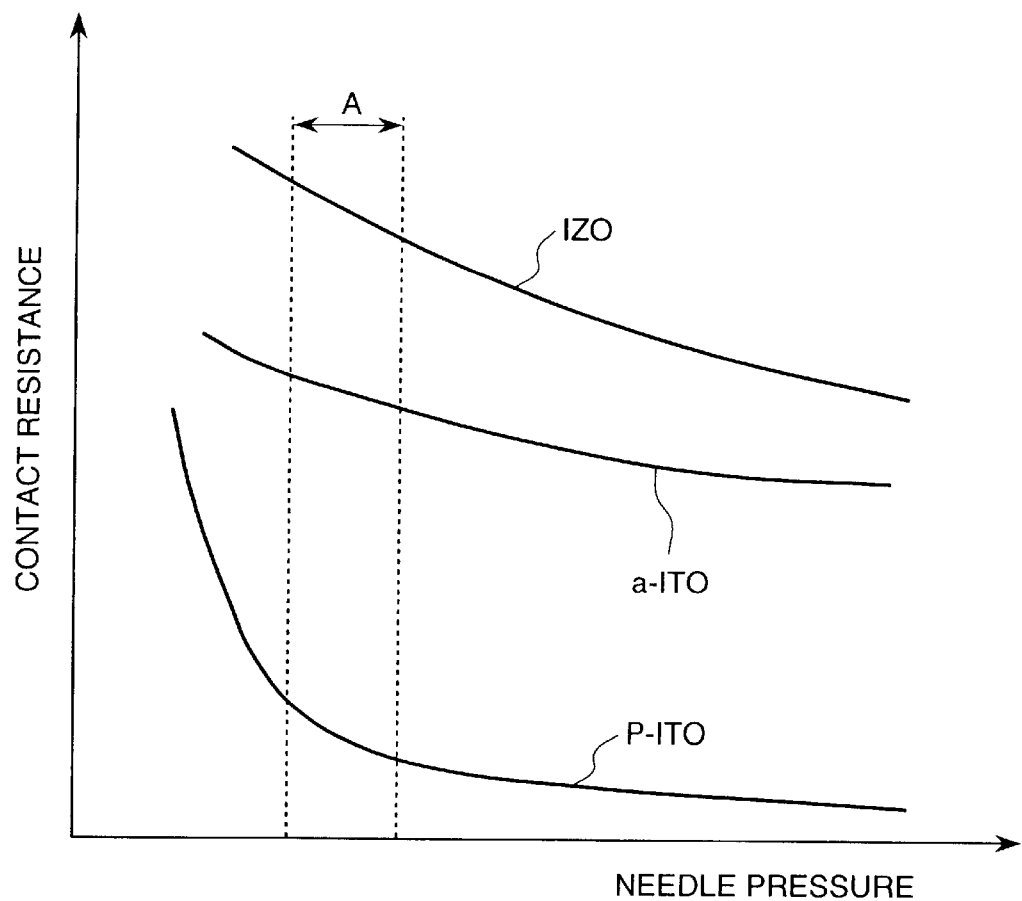
FIG. 14 is a diagram showing characteristics of candidate data line materials for an LCD unit based on the present invention.
Figure 15:
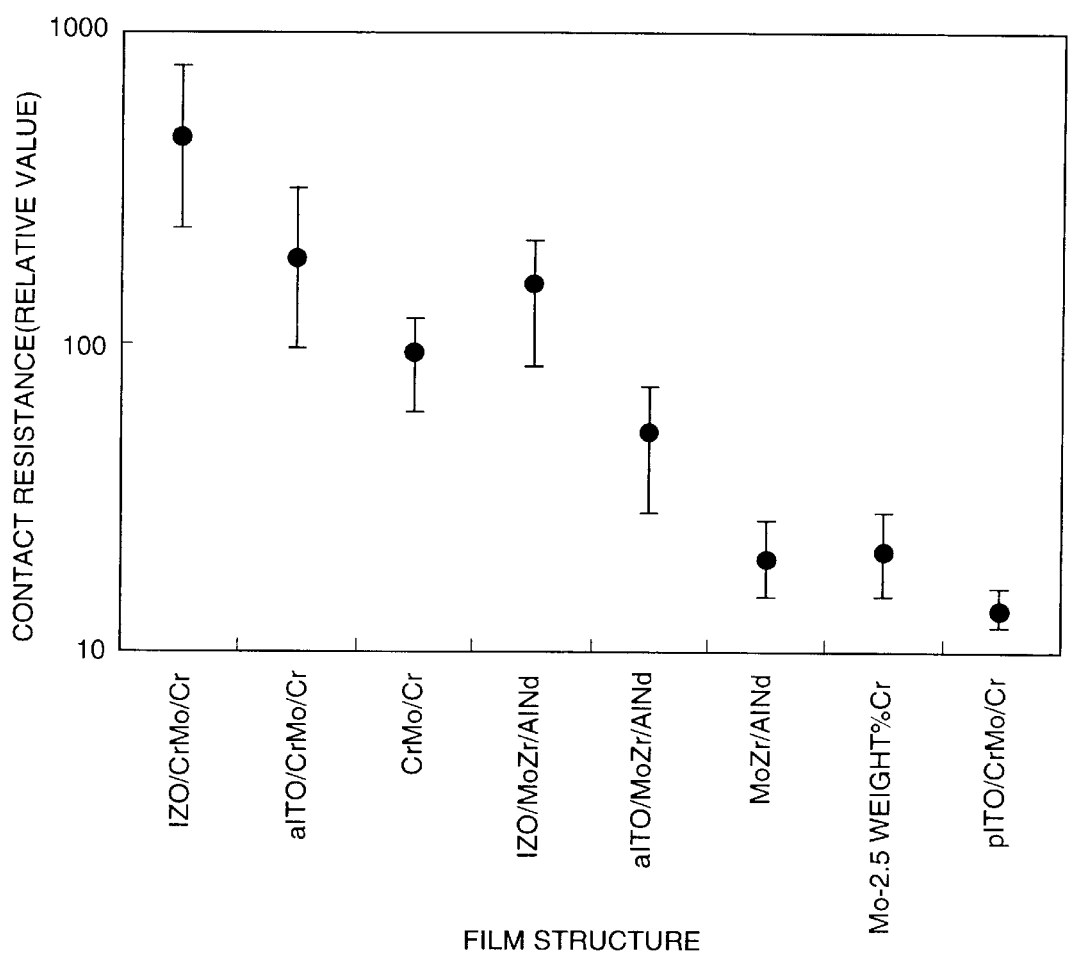
FIG. 15 is a diagram showing characteristics of other candidate data line materials for an LCD unit based on the present invention.
Figure 16:
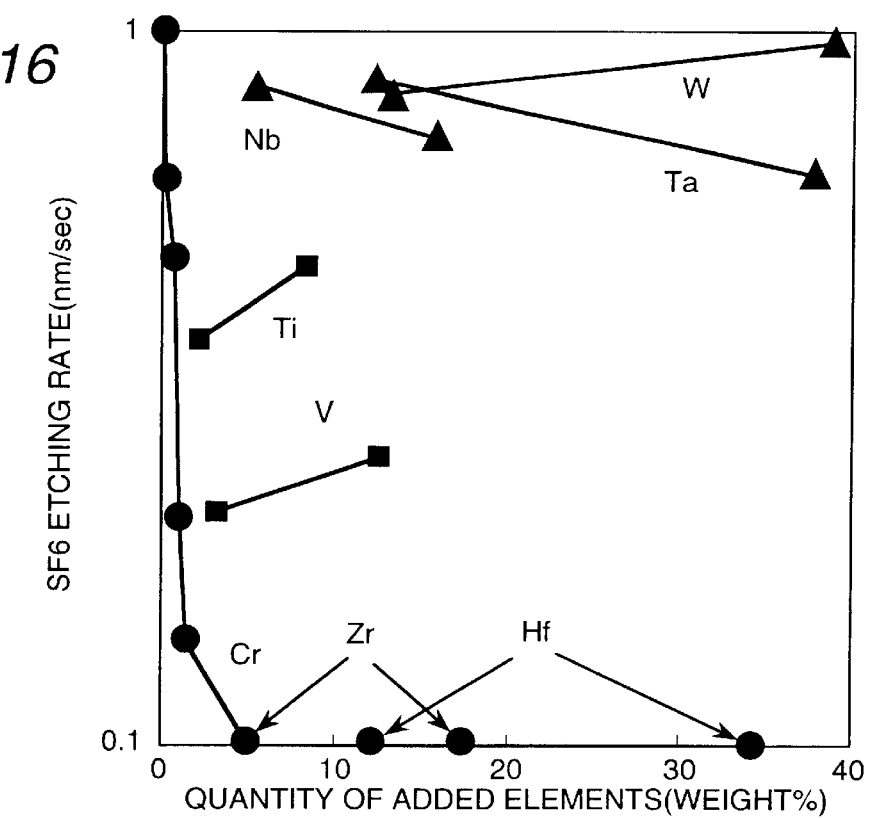
FIG. 16 is a diagram showing characteristics of other candidate data line materials for an LCD unit based on the present invention.
Figure 17:
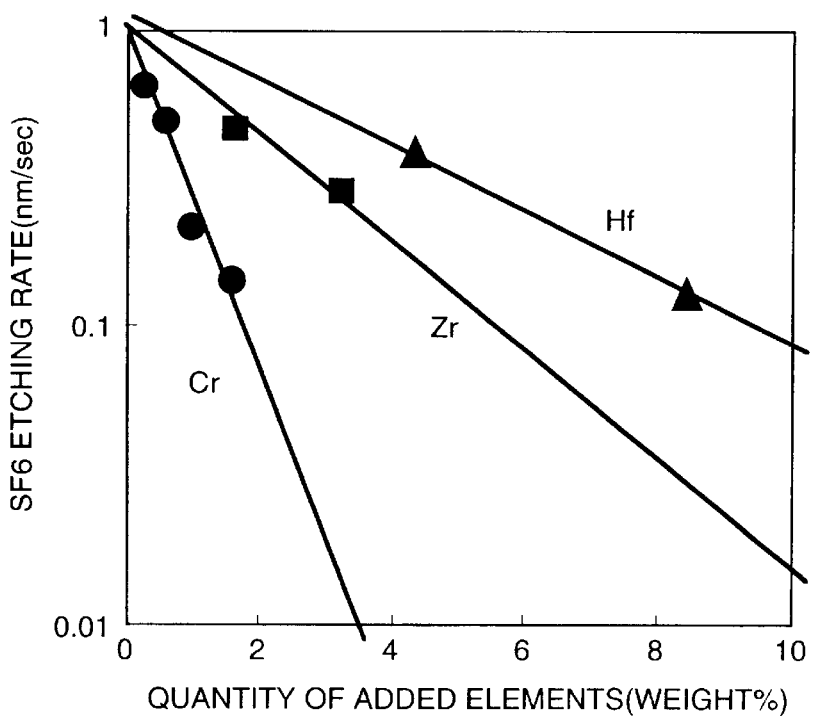
FIG. 17 is a diagram showing characteristics of candidate data line materials for an LCD unit based on the present invention.
Figure 18A:
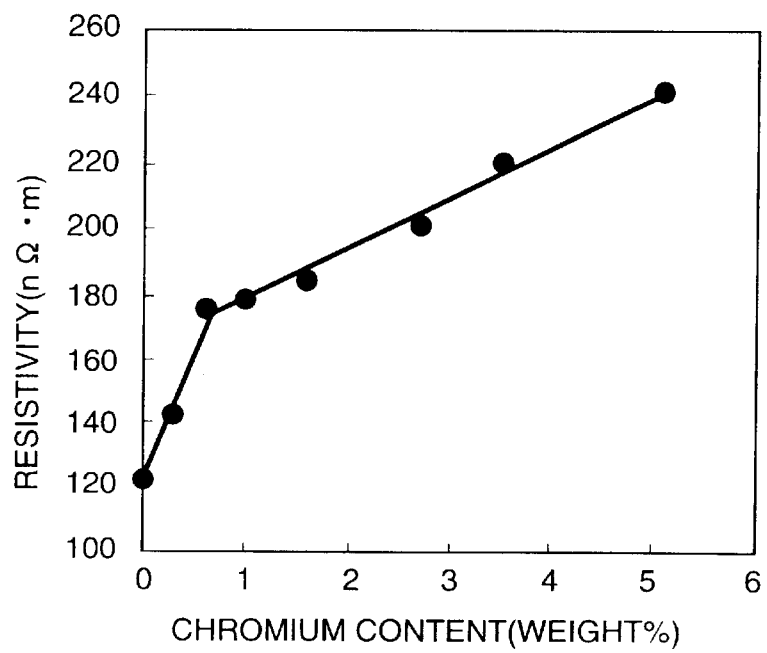
FIGS. 18(a) and 18(b) are diagrams showing characteristics of other candidate data line materials for an LCD unit based on the present invention.
Figure 18B:
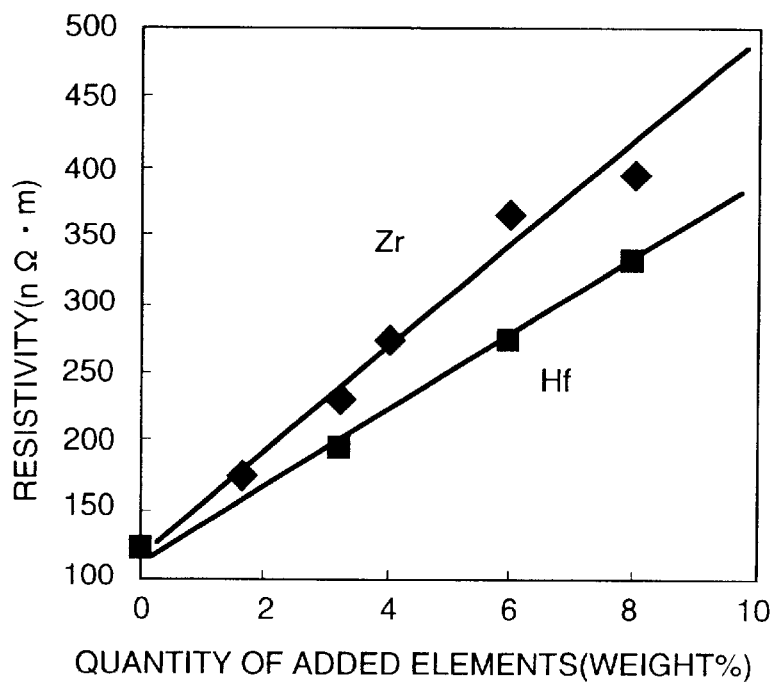
Figure 19:
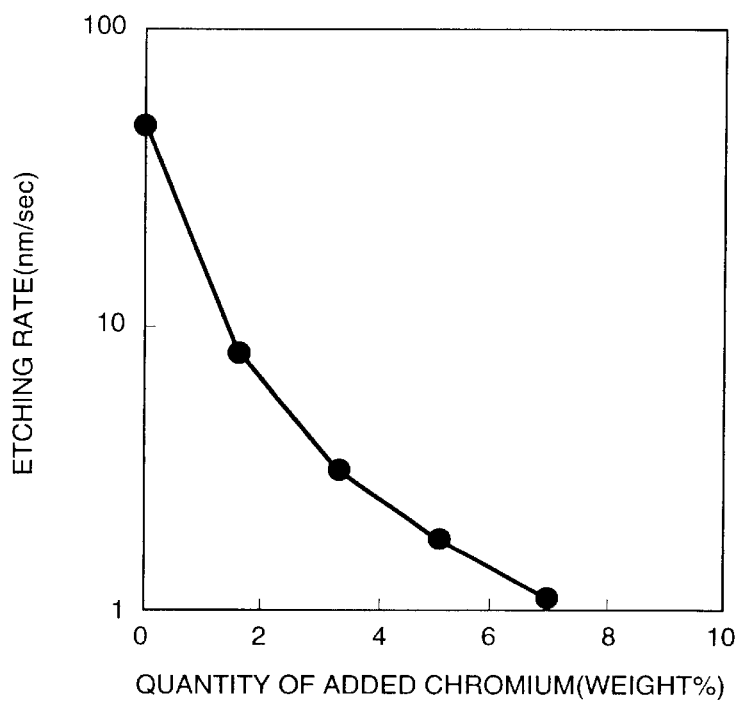
FIG. 19 is a diagram showing characteristics of other candidate data line materials for an LCD unit based on the present invention.
Figure 20:
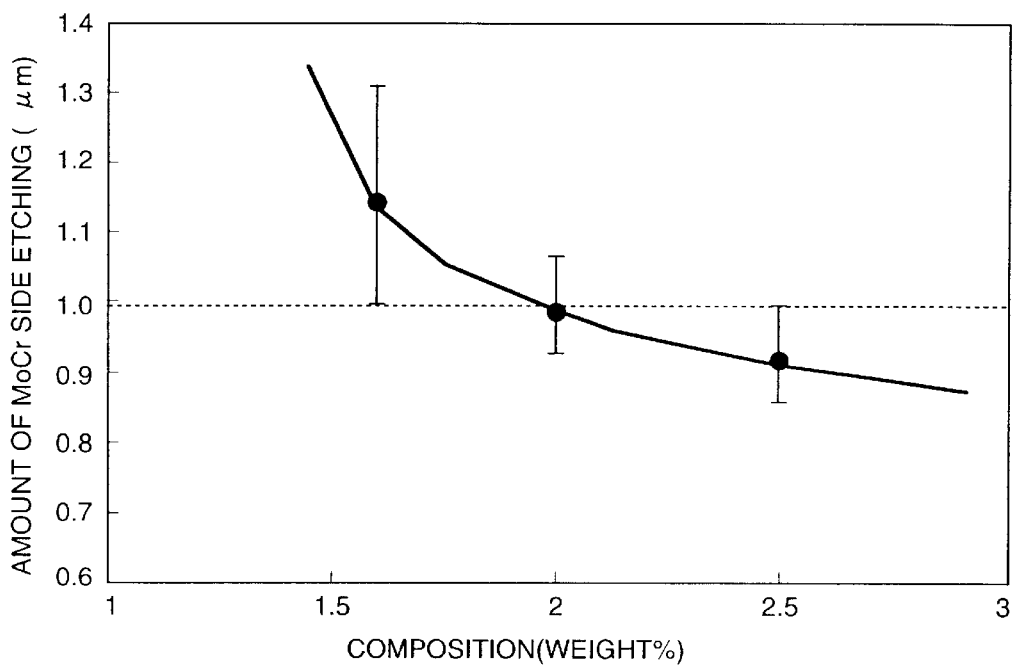
FIG. 20 is a diagram showing characteristics of candidate data line materials for an LCD unit based on the present invention.
Figure 21A:
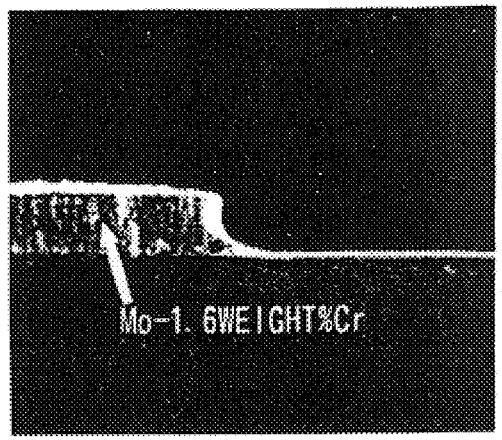
FIGS. 21(a) to 21(c) are photos showing characteristics of other candidate data line materials for an LCD unit based on the present invention.
Figure 21B:
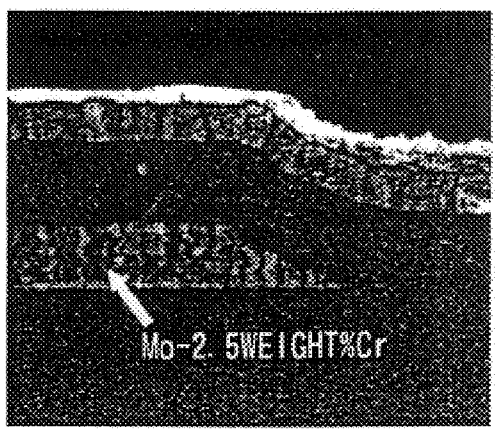
Figure 21C:
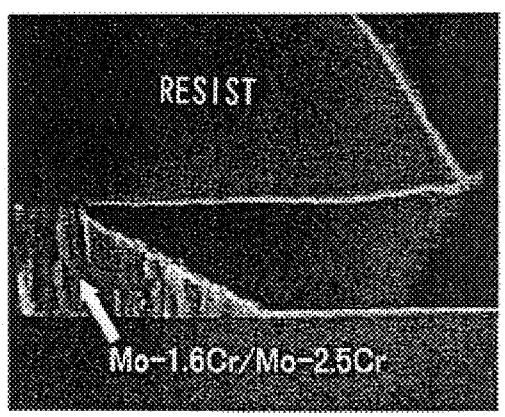

For the horizontal electric field type, care must be taken of the following:

If the cross-sectional shape of pixel electrode PX deteriorates, more specifically, if its taper takes a cliff-line shape, both sides of the electrode may remain unrubbed. In this case, light will leak from that portion during the display of black, resulting in a display quality defect appearing as deteriorated contrast. FIG. 12, although slightly different from FIG. 11 in terms of structure, shows pixels of the horizontal electric field type and is a photo that shows the observations that were obtained using an optical microscope during black display. It can be seen from FIG. 12 that both sides of pixel electrode PX are shining in white (indicated as LK in the figure). FIG. 13 shows the cross-sectional shape of pixel electrode PX (the observations that were obtained using an scanning electron microscope). It can be seen from this figure that both sides of the wiring which has a cliff-like portion shine in white. In this embodiment, however, pixel electrode PX is made of Mo—Cr and since its cross section is formed into a forward tapered shape, as mentioned earlier, the defect in which the contrast deteriorates can be eliminated.

Several embodiments relating to the present invention have been shown and described heretofore. The present invention, however, is not limited by these embodiments themselves, and can be flexibly modified or improved in the range of the knowledge that we can gain. Its scope of claims, therefore, is not limited by the details shown and described heretofore, and compasses the modification and improvement ranges mentioned above.

What is claimed is:

1. A liquid crystal display unit comprising one pair of substrates, a liquid crystal layer held between said pair of substrates, a plurality of scanning lines formed on one of the two substrates, a plurality of data lines which cross said scanning lines in matrix form, thin film transistors formed near the crossing points of said scanning lines and data lines, and pixel electrodes connected to said thin film transistors, wherein the source electrode and drain electrode of each thin film transistor, and each data line, are made of a molybdenum alloy having a chromium content of 2 weight % or more, but up to 5 weight %.

2. A liquid crystal display unit according to claim 1 above, wherein said liquid crystal display unit is characterized in that the channel length of each thin film transistor is 7 $\mu$m or less.

3. A liquid crystal display unit according to claim 1 or 2 above, wherein said liquid crystal display unit is characterized in that it is so constructed as to bring said molybdenum alloy and an anisotropic conductive film into direct contact at the terminal portion of each data line mentioned above.

4. A liquid crystal display unit according to claim 1 or 2, above, wherein said liquid crystal display unit is characterized in that each scanning line includes aluminum or an aluminum alloy and in that each pixel electrode is constructed using an indium tin oxide or indium zinc oxide composed mainly of an amorphous phase.

5. A liquid crystal display unit according to claim 1 or 2 above, wherein said liquid crystal display unit is characterized in that each scanning line is constructed into a film lamination whose lower layer consists of aluminum or an aluminum alloy and whose upper layer consists of a molybdenum alloy with a zirconium content of 2.6 weight % or more, but up to 23 weight %, and in that each pixel electrode is constructed using an indium tin oxide or indium zinc oxide composed mainly of an amorphous phase.

6. A liquid crystal display unit according to claim 1 or 2 above, wherein said liquid crystal display unit is characterized in that its driver chips are mounted using the Chip-on-Glass (COG) method.

7. A liquid crystal display unit according to claim 6 above, wherein said liquid crystal display unit is characterized in that at least one portion of display data and reference potential data are electrically connected between said driver chips and in that of said two substrates, only the substrate provided with said thin-firm transistors has wiring formed and used as part of said electrical connection.

8. A liquid crystal display unit comprising
   one pair of substrates, a liquid crystal layer held between said pair of substrates, a plurality of scanning lines formed on one of the two substrates, a plurality of data lines which cross said scanning signal lines in matrix form, thin film transistors formed near the crossing points of said scanning lines and data lines, and pixel electrodes connected to said thin film transistors, wherein said liquid crystal display unit is characterized in that the source electrode and drain electrode of each thin film transistor, and each data line, are each constructed into a film lamination consisting of a first electroconductive film and a second electroconductive film, in that said first electroconductive film is an alloy composed mainly of molybdenum alloy having a chromium content of 2 weight % or more, but up to 5 weight %, and in that the second electroconductive film is a molybdenum alloy located above the first electroconductive film and lower in chromium content than the first electroconductive film.

9. A liquid crystal display unit according to claim 8 above, wherein said liquid crystal display unit is characterized in that the channel length of each thin film transistor is 7 $\mu$m or less.

10. A liquid crystal display unit according to claim 8 or 9 above, wherein said liquid crystal display unit is characterized in that it is so constructed as to bring said molybdenum alloy and the anisotropic conductive films into direct contact at the terminal portion of each data line mentioned above.

11. A liquid crystal display unit according to claim 8 or 9 above, wherein said liquid crystal display unit is characterized in that each scanning line includes aluminum or an aluminum alloy and in that each pixel electrode is constructed using an indium tin oxide or indium zinc oxide composed mainly of an amorphous phase.

12. A liquid crystal display unit according to claim 8 or 9 above, wherein said liquid crystal display unit is characterized in that each scanning line is constructed into a film lamination whose lower layer consists of aluminum or an aluminum alloy and whose upper layer consists of a molybdenum alloy with a zirconium content of 2.6 weight % or more, but up to 23 weight %, and in that each pixel electrode is constructed using an indium tin oxide or indium zinc oxide composed mainly of an amorphous phase.

13. A liquid crystal display unit according to claim 8 or 9 above, wherein said liquid crystal display unit is characterized in that its driver chips are mounted using the Chip-on-Glass (COG) method.

14. A liquid crystal display unit according to claim 13 above, wherein said liquid crystal display unit is characterized in that at least one portion of display data and reference potential data are electrically connected between said driver chips and in that of said two substrates, only the substrate provided with said thin-firm transistors has wiring formed and used as part of said electrical connection.

15. A liquid crystal display unit comprising one pair of substrates, a liquid crystal layer held between said pair of substrates, a plurality of scanning lines formed on one of the two substrates, a plurality of data lines which cross said scanning lines in matrix form, thin film transistors formed near the crossing points of said scanning lines and data lines, and at least one pair of pixel electrodes and opposed electrodes formed on one of said two substrates in a plurality of pixels in an area enclosed with said scanning lines and data lines; said pixel electrodes being supplied with data signals via said thin film transistors driven in accordance with the scanning supplied from the scanning signal lines, and said opposed electrodes being supplied with reference voltages via opposed voltage signal lines formed over said pixels, wherein said liquid crystal display unit is characterized in that the data lines and the pixel electrodes are each made of an alloy consisting mainly of molybdenum alloy with a chromium content of 2 weight % or more, but up to 5 weight %.

16. A liquid crystal display unit according to claim 15 above, wherein said liquid crystal display unit is characterized in that the source electrode and drain electrode of each thin film transistor are the same in film structure as said data lines and pixel electrodes, and in that the channel length of the thin film transistor is 7 $\mu$m or less.

17. A liquid crystal display unit according to claim 15 or 16 above, wherein said liquid crystal display unit is characterized in that each of said scanning lines includes aluminum or an aluminum alloy.

18. A liquid crystal display unit according to claim 15 or 16 above, wherein said liquid crystal display unit is characterized in that each scanning line is constructed into a film lamination whose lower layer consists of aluminum or an aluminum alloy and whose upper layer consists of a molybdenum alloy with a zirconium content of 2.6 weight % or more, but up to 23 weight %.

19. A liquid crystal display unit according to claim 15 or 16 above, wherein said liquid crystal display unit is characterized in that its driver chips are mounted using the Chip-on-Glass (COG) method.

20. A liquid crystal display unit according to claim 19 above, wherein said liquid crystal display unit is characterized in that at least one portion of display data and reference potential data are electrically connected between said driver chips and in that of said two substrates, only the substrate provided with said thin-firm transistors has wiring formed and used as part of said electrical connection.

21. A liquid crystal display unit comprising one pair of substrates, a liquid crystal layer held between said pair of substrates, a plurality of scanning lines formed on one of the two substrates, a plurality of data lines which cross said scanning lines in matrix form, thin film transistors formed near the crossing points of said scanning lines and data lines, and at least one pair of pixel electrodes and opposed electrodes formed on one of said two substrates in a plurality of pixels in an area provided between said scanning lines and data lines; said pixel electrodes being supplied with data signals via said thin film transistors driven in accordance with the scanning signals supplied from the scanning lines, and said opposed electrodes being supplied with reference voltages via opposed voltage signal lines formed over said pixels, wherein said liquid crystal display unit is characterized in that the data lines and the pixel electrodes are each constructed into a film lamination consisting of a first electroconductive film and a second electroconductive film, in that said first electroconductive film is an alloy consisting mainly of molybdenum alloy with a chromium content of 2 weight % or more, but up to 5 weight %, and in that said second electroconductive film is a molybdenum alloy located above the first electroconductive film and lower in chromium content than the first electroconductive film.

22. A liquid crystal display unit according to claim 21 above, wherein said liquid crystal display unit is characterized in that the source electrode and drain electrode of each thin film transistor are the same in film structure as said data lines and pixel electrodes, and in that the channel length of the thin film transistor is 7 $\mu$m or less.

23. A liquid crystal display unit according to claim 21 or 22 above, wherein said liquid crystal display unit is characterized in that each of said scanning lines includes aluminum or an aluminum alloy.

24. A liquid crystal display unit according to claim 21 or 22 above, wherein said liquid crystal display unit is characterized in that each scanning signal line is constructed into a film lamination whose lower layer consists of aluminum or an aluminum alloy and whose upper layer consists of a molybdenum alloy with a zirconium content of 2.6 weight % or more, but up to 23 weight %.

25. A liquid crystal display unit according to claim 21 or 22 above, wherein said liquid crystal display unit is characterized in that its driver chips are mounted using the Chip-on-Glass (COG) method.

26. A liquid crystal display unit according to claim 25 above, wherein said liquid crystal display unit is characterized in that at least one portion of display data and reference potential data are electrically connected between said driver chips and in that of said two substrates, only the substrate provided with said thin-firm transistors has wiring formed and used as part of said electrical connection.

* * * * *